(12) United States Patent
Goldfield et al.

(10) Patent No.: US 12,086,876 B2
(45) Date of Patent: Sep. 10, 2024

(54) USER INTERFACE FOR RECURRING TRANSACTION MANAGEMENT

(71) Applicant: Ramp Business Corporation, New York, NY (US)

(72) Inventors: Ori Ephraim Goldfield, New York, NY (US); Calvin Jun-Gong Lee, Weehawken, NJ (US); Geoffrey Jacques Charles, Brooklyn, NY (US); Ariel Petren Langer, New York, NY (US); Diego D. Zaks Barrios, New York, NY (US)

(73) Assignee: Ramp Business Corporation, New York, NY (US)

( * ) Notice: Subject to any disclaimer, the term of this patent is extended or adjusted under 35 U.S.C. 154(b) by 0 days.

(21) Appl. No.: 18/461,405

(22) Filed: Sep. 5, 2023

(65) Prior Publication Data
US 2023/0419400 A1   Dec. 28, 2023

Related U.S. Application Data

(63) Continuation of application No. 17/390,701, filed on Jul. 30, 2021, now Pat. No. 11,861,693.

(51) Int. Cl.
*G06Q 40/02* (2023.01)
*G06F 3/0482* (2013.01)
(Continued)

(52) U.S. Cl.
CPC ........... *G06Q 40/02* (2013.01); *G06F 3/0482* (2013.01); *G06F 16/35* (2019.01);
(Continued)

(58) Field of Classification Search
CPC ............ G06Q 10/00–50/00; G06F 1/00–2123
(Continued)

(56) References Cited

U.S. PATENT DOCUMENTS 10,157,352 B1 * 12/2018 Chan ...................... G06N 5/047
10,223,691 B2 * 3/2019 Katzin .............. G06Q 30/0623
(Continued)

OTHER PUBLICATIONS

European Patent Office, European Search Report and Opinion, European Patent Application No. 22187127, filed Jan. 3, 2023, 6 pages.

*Primary Examiner* — Alan S Miller
(74) *Attorney, Agent, or Firm* — Fenwick & West LLP

(57) ABSTRACT

A system for detects and manages recurring transactions incurred by members of a client organization. The system includes a computing server that is configured to classify named entities into a category of transacting named entities. For example, the computing server classifies a list of named entities that offer subscription services and hence, create recurring transactions with the client organization. The computing server receives transaction data and determines that a target transacting named entity extracted from the received data belongs to the category (e.g., there is a named entity in the received transaction data that has sold a service to the client organization more than once). The computing server may then determine the presence and frequency of a subscription transaction series in the received transaction data, and cause a predicted a timing of an upcoming transaction in the subscription transaction series to be displayed in a graphical user interface (GUI).

20 Claims, 12 Drawing Sheets

(51) Int. Cl.
*G06F 16/35* (2019.01)
*G06Q 20/12* (2012.01)
*G06Q 30/016* (2023.01)
*G06Q 30/0204* (2023.01)
*G06Q 40/12* (2023.01)

(52) U.S. Cl.
CPC ......... *G06Q 30/0204* (2013.01); *G06Q 40/12* (2013.12); *G06Q 20/127* (2013.01); *G06Q 30/016* (2013.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 10,445,838 | B2* | 10/2019 | Unser | G06Q 20/12 |
| 10,475,051 | B2* | 11/2019 | Ben-Eliezer | G06Q 30/0201 |
| 10,476,974 | B2* | 11/2019 | Jones-McFadden | H04L 67/535 |
| 11,379,506 | B2* | 7/2022 | Stojanovic | G06F 16/215 |
| 11,423,373 | B1* | 8/2022 | Book | G06Q 20/40 |
| 2009/0148048 | A1* | 6/2009 | Hosomi | G06F 16/35 382/190 |
| 2013/0325681 | A1* | 12/2013 | Somashekar | H04M 15/851 705/35 |
| 2013/0339088 | A1* | 12/2013 | Olsen | G06Q 30/0202 705/7.31 |
| 2016/0063511 | A1* | 3/2016 | Ben-Eliezer | G06Q 30/0631 705/7.29 |
| 2017/0147688 | A1* | 5/2017 | Chaturvedi | G06Q 10/10 |
| 2019/0318367 | A1* | 10/2019 | Myles | G06Q 10/0637 |
| 2020/0184434 | A1* | 6/2020 | Evans | G06Q 20/102 |
| 2020/0202379 | A1* | 6/2020 | Yacoub | G06Q 30/0222 |
| 2021/0125254 | A1* | 4/2021 | O'Neill | G06Q 30/0282 |
| 2022/0284459 | A1* | 9/2022 | Kwok | G06Q 30/0206 |
| 2022/0405477 | A1 | 12/2022 | Lee et al. | |

* cited by examiner

Vendors

Search & Filter 🔍 —1011

| Merchant | Owner | Total Spend | Last 30 Days | Next Payment* | Frequency* | Owner Dept | Owner Lo |
|---|---|---|---|---|---|---|---|
| ⊙ Hecate | Lewis Drum 🔍 | $2,548.00 Since 01/04/20 | $0.00 | ⊙ $1,000.00 Today | Annual 🔍 | Engineering | Main Off |
| ⬤ Merchant | Megan Yen 🔍 | $239.92 Since 01/04/20 | $29.99 | ⊙ $29.99 Tomorrow | Monthly 🔍 | Business | Main Off |
| 🐾 Hobbit | Katrim Atiye 🔍 | $10,777.29 Since 01/04/20 | $1,021.88 ↑16% | ⊙ $1,021.88 Tomorrow | Monthly 🔍 | Engineering | Main Off |
| ✈ ABC | Tyn Gunn 🔍 | $3,973.37 Since 01/04/20 | $1,121.69 ↑17% | ⊙ $1,121.69 Tomorrow | Monthly 🔍 | Operations | Main Off |
| △ Gaia | Matt Sheek 🔍 | $725.00 Since 01/04/20 | $75.00 ↑50% | ⊙ $75.00 Tomorrow | Monthly 🔍 | Operations | Main Off |
| ✿ Techy | Megan Sloa 🔍 | $32,173.50 Since 01/04/20 | $613.50 ↓50% | ⊙ $613.50 Tomorrow | Monthly 🔍 | Business | Main Off |
| ⚷ Season | Karim Atul 🔍 | $9,786.40 Since 01/04/20 | $1,015.27 ↑13% | ⊙ $1,015.27 Tomorrow | Monthly 🔍 | Engineering | Main Off |
| ☯ Tag | Lewis Lee 🔍 | $2,242.71 Since 01/04/20 | $140.00 | ⊙ $140.00 Tomorrow | Monthly 🔍 | Engineering | Main Off |
| 📷 Capture | Cate Cobb 🔍 | $1,376.33 Since 01/04/20 | $434.17 ↓34% | ⊙ $287.48 In 2 days | Monthly 🔍 | Engineering | Main Off |

≪
- ◀ Insights
- ⟳ Transactions
- 📇 Cards
- 👥 People
- 📋 Bill Pay  1021
- 🎫 Vendors
- ⏱ Reimburse
- 📊 Accounting
---
- 💳 My Ramp
- ★ Earn $250

*FIG. 10*

Large Transactions 
Hobbit $1,015.11
Megan Yen - Operations
Content Marketing $9,000.00
Katrim Atiyeh - Marketing
Upcoming Bills  | See All
Based on your transaction history, we predict the following bills when due this week.
Gaia $1,121.69
Tyn Gunn – Monthly – 07/01/21
Techy $1,021.88
Katrim Atiyeh – Monthly – 07/01/21
ABC $1,015.27
Susan Sheek – Monthly – 07/01/21
New Users  | See All
1100
*FIG. 11*

USER INTERFACE FOR RECURRING TRANSACTION MANAGEMENT

CROSS REFERENCE TO RELATED APPLICATIONS

This application is a continuation of U.S. patent application Ser. No. 17/390,701, filed on Jul. 30, 2021, which is incorporated herein by reference in its entirety for all purposes

TECHNICAL FIELD

The present disclosure generally relates to transaction management for recurring transactions and, particularly, to a user interface for predicting recurring transactions and providing relevant transaction recommendations.

BACKGROUND

Trillions of transactions are made daily, including recurring transactions such as those for a subscription-based service. The records of those transactions can contain data that lack a standard protocol or format, leading to transaction data to appear noisy for a receiving party who does not have full information of data schemas and structures used. Organizations can subscribe to multiple subscriptions, which may be difficult to track when transactions of an organizations' members (e.g., employees) can accumulate to tens of thousands of transactions in a day where not all are subscription-based transactions. Analyzing an organization's transaction data using complex rules to compensate for the lack of a standard format can demand intense computing resources.

SUMMARY

Embodiments are related to detecting and managing recurring transactions incurred by members of a client organization. A system includes a computing server that is configured to classify named entities into a category of transacting named entities. For example, the computing server classifies a list of named entities that offer subscription services and, hence, create recurring transactions with the client organization. The computing server receives transaction data and determines that a target transacting named entity extracted from the received data belongs to the category (e.g., there is a vendor in the received transaction data that has sold a service to the client organization more than once). The computing server may then determine the presence and frequency of a subscription transaction series in the received transaction data, and cause a predicted timing of an upcoming transaction in the subscription transaction series to be displayed in a graphical user interface (GUI). By processing unstructured transaction data to classify named entities in subsequently received transaction data, the computing server can reduce the processing resources expended to detect recurring transactions in transaction data.

This general architecture has application in various areas, such as payment transaction management. In one example, an organization issues payment accounts to employees who have authority to purchase subscription based services. To increase the efficiency of transactions made by the employees, a computing server applies named entity identification rules, which the computing server has previously determined by analyzing transactions from one or more organizations, to determine that the employees have been incurring subscription transactions with SaaS (Software as a Service) entities for services such as a messaging platform and data storage and with non-SaaS entities for services such as catering. The employees may have incurred subscriptions to two different data storage services that identify themselves using different formats in transaction data (e.g., credit card statements). The computing server applies rules to identify each of the data storage services in the organization's transaction data and transactions made to the services. Thus, the computing server identifies named entities and recurring transactions with the identified entities, creating structure from unstructured transaction data.

Another benefit of the computing server's processing of unstructured data applies to providing transaction recommendations. Following the previous example, a first data storage service of the two data storage services may not be used as frequently as the second data storage service or it is not used at all by the organization's employees. After identifying the two data storage services, the computing server can apply transaction recommendation models to detect the redundancy in subscribing to both services and provide a recommendation to the organization to remove the subscription to the first data storage service. By identifying the named entities and recurring transactions using predetermined rules to create structured data, the computing server can identify opportunities to optimize transactions more efficiently in the structured data, utilizing resources that may otherwise have been spent on an unnecessarily intensive search for the same recurring transactions in unstructured data.

BRIEF DESCRIPTION OF THE DRAWINGS

FIG. 10 is a recurring transaction and named entity management portal, in accordance with an embodiment.

FIG. 11 is a transaction summary portal, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
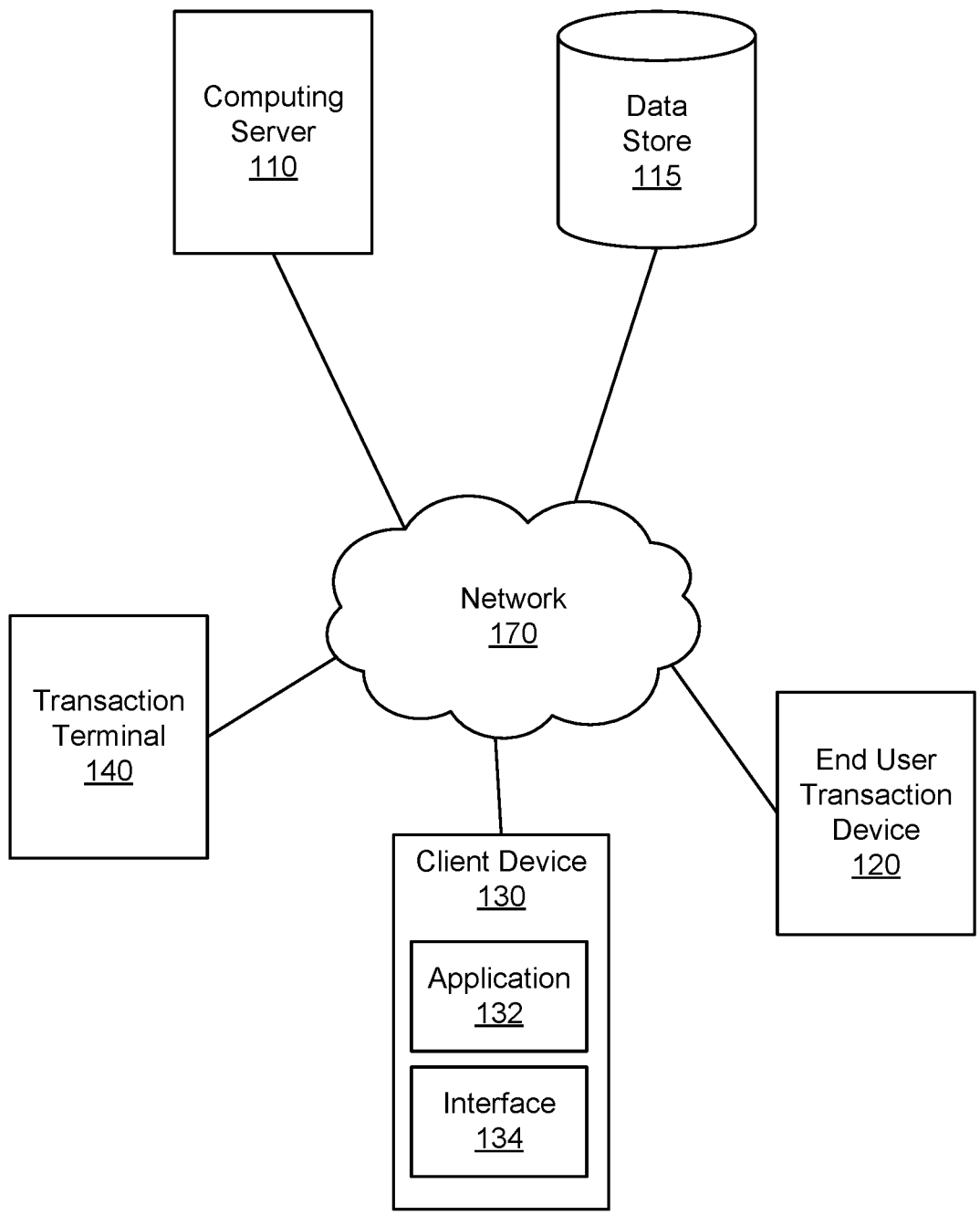
FIG. 1 is a block diagram illustrating an example system environment, in accordance with an embodiment.

Figure (FIG. 1 is a block diagram that illustrates a transaction management computing environment 100, in accordance with an embodiment. The system environment 100 includes a computing server 110, a data store 115, an end user transaction device 120, a client device 130, and a transaction terminal 140. The entities and components in the system environment 110 communicate with each other through network 170. In various embodiments, the system environment 100 includes fewer or additional components. In some embodiments, the system environment 100 also includes different components. While each of the components in the system environment 100 is described in a singular form, the system environment 100 may include one or more of each of the components. For example, in many situations, the computing server 110 can issue multiple end user transaction devices 120 for different end users. Different client devices 130 may also access the computing server 110 simultaneously.

The computing server 110 includes one or more computers that perform various tasks related to managing transactions, managing transacting named entities such as vendors and merchants, providing transaction improvement recommendations such as saving insights, and sending data to different portals for clients to manage transactions and review transactions through various graphical illustrations. For example, the computing server 110 analyzes the transaction data of a client, identifies a subscription transaction series associated with a specific merchant, determines a recurring frequency of the subscription transaction series, and predicts the timing of an upcoming transaction in the subscription transaction series. The computing server 110 may also provide transaction improvement recommendations such as insights that can reduce the costs of a subscription series (e.g., saving insights), insights that provide suggestions of lower pricing, and other insights that can help the client to streamline various transactions.

In one embodiment, the computing server 110 provides its clients with various transaction and merchant management services as a form of cloud-based software, such as software as a service (SaaS). Examples of components and functionalities of the computing server 110 are discussed in further detail below with reference to FIG. 2. The computing server 110 may also be referred to as a transaction management server, a vendor management server, a subscription management server, a saving insight server, or an artificial intelligence (AI) server. The computing server 110 may provide a SaaS platform for various clients to manage their transactions, subscriptions, and merchants.

The data store 115 includes one or more computing devices that include memories or other storage media for storing various files and data of the computing server 110. The data stored in the data store 115 includes accounting information, transaction data, credit card profiles, card rules and restrictions, merchant profiles, merchant identification rules, spending records and other related data associated with various clients of the computing server 110. In various embodiments, the data store 115 may take different forms. In one embodiment, the data store 115 is part of the computing server 110. For example, the data store 115 is part of the local storage (e.g., hard drive, memory card, data server room) of the computing server 110. In some embodiments, the data store 115 is a network-based storage server (e.g., a cloud server). The data store 115 may be a third-party storage system such as AMAZON AWS, DROPBOX, RACKSPACE CLOUD FILES, AZURE BLOB STORAGE, GOOGLE CLOUD STORAGE, etc. The data in the data store 115 may be structured in different database formats such as a relational database using the structured query language (SQL) or other data structures such as a non-relational format, a key-value store, a graph structure, a linked list, an object storage, a resource description framework (RDF), etc. In one embodiment, the data store 115 uses various data structures mentioned above.

An end user transaction device 120 is a device that enables the holder of the device 120 to perform a transaction with a party, such as making a payment to a merchant for goods and services based on information and credentials stored at the end user transaction device 120. An end user transaction device 120 may also be referred to as an end user payment device. Examples of end user transaction devices 120 include payment cards such as credit cards, debit cards, and prepaid cards, other smart cards with chips such as radio frequency identification (RFID) chips, portable electronic devices such as smart phones that enable payment methods such as APPLE PAY or GOOGLE PAY, and wearable electronic devices. The computing server 110 issues end user transaction devices 120 such as credit cards for its organizational clients and may impose spending control rules and restrictions on those cards. While credit cards are often used as examples in the discussion of this disclosure, various architectures and processes described herein may also be applied to other types of end user transaction devices 120.

A client device 130 is a computing device that belongs to a client of the computing server 110. A client uses the client device 130 to communicate with the computing server 110 and performs various transaction, subscription and vendor management related tasks such as reviewing recurring transaction information associated with various vendors, pre-approving or restricting upcoming transactions, setting transaction rules and restrictions on cards, and adopting or rejecting transaction improvement recommendations. The user of the client device 130 may be a manager, an accounting administrator, or a general employee of an organization.

While in this disclosure a client is often described as an organization, a client may also be a natural person or a robotic agent. A client may be referred to an organization or its representative such as its employee.

A client device 130 includes one or more applications 132 and interfaces 134 that may display visual elements of the applications 132. The client device 130 may be any computing device. Examples of such client devices 130 include personal computers (PC), desktop computers, laptop computers, tablets (e.g., iPADs), smartphones, wearable electronic devices such as smartwatches, or any other suitable electronic devices.

The application 132 is a software application that operates at the client device 130. In one embodiment, an application 132 is published by the party that operates the computing server 110 to allow clients to communicate with the computing server 110. For example, the application 132 may be part of a SaaS platform of the computing server 110 that allows a client to create credit cards and accounts and perform various transaction management tasks. In various embodiments, the application 132, which may be part of the SaaS platform, may be of different types. In one embodiment, an application 132 is a web application that runs on JavaScript and other backend algorithms. In the case of a web application, the application 132 cooperates with a web browser to render a front-end interface 134. In another embodiment, an application 132 is a mobile application. For example, the mobile application may run on Swift for iOS and other APPLE operating systems or on Java or another suitable language for ANDROID systems. In yet another embodiment, an application 132 may be a software program that operates on a desktop computer that runs on an operating system such as LINUX, MICROSOFT WINDOWS, MAC OS, or CHROME OS.

An interface 134 is a suitable interface for a client to interact with the computing server 110. The client may communicate to the application 132 and the computing server 110 through the interface 134. The interface 134 may take different forms. In one embodiment, the interface 134 may be a web browser such as CHROME, FIREFOX, SAFARI, INTERNET EXPLORER, EDGE, etc. and the application 132 may be a web application that is run by the web browser. In one embodiment, the interface 134 is part of the application 132. For example, the interface 134 may be the front-end component of a mobile application or a desktop application. In one embodiment, the interface 134 also is a graphical user interface (GUI) which includes graphical elements and user-friendly control elements. In one embodiment, the interface 134 does not include graphical elements but communicates with the data management server 120 via other suitable ways such as application program interfaces (APIs), which may include conventional APIs and other related mechanisms such as webhooks.

In some embodiments, the client device 130 and the end user transaction device 120 belong to the same domain. For example, a company client can request the computing server 110 to issue multiple company credit cards for the employees. A domain refers to an environment in which a system operates and/or an environment for a group of units and individuals to use common domain knowledge to organize activities, information and entities related to the domain in a specific way. An example of a domain is an organization, such as a business, an institute, or a subpart thereof and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of an organization. For example, a domain may be a subsidiary of a company. Various divisions or departments of the organization may have their own definitions, internal procedures, tasks, and entities. In other situations, multiple organizations may share the same domain.

A transaction terminal 140 is an interface that allows an end user transaction device 120 to make electronic fund transfers with a third party. Electronic fund transfer can be credit card payments, automated teller machine (ATM) transfers, direct deposits, debits, online transfers, peer-to-peer transactions such as VENMO, instant-messaging fund transfers such as FACEBOOK PAY and WECHAT PAY, wire transfer, electronic bill payment, automated clearing house (ACH) transfer, cryptocurrency transfer, blockchain transfer, etc. Depending on the type of electronic fund transfers, a transaction terminal 140 may take different forms. For example, if an electronic fund transfer is a credit card payment, the transaction terminal 140 can be a physical device such as a point of sale (POS) terminal (e.g., a card terminal) or can be a website for online orders. An ATM, a bank website, a peer-to-peer mobile application, and an instant messaging application can also be examples of a transaction terminal 140. The third party is a transferor or transferee of the fund transfer. For example, in a card transaction, the third party may be a merchant. In an electronic fund transfer such as a card payment for a merchant, the transaction terminal 140 may generate a transaction data that carries information related to the end user transaction device 120, the merchant, and the transaction. The transaction data is transmitted to other parties, such as credit card companies, banks, the computing server 110 for approval or denial of the transaction.

Various servers in this disclosure may take different forms. In one embodiment, a server is a computer that executes code instructions to perform various processes described in this disclosure. In another embodiment, a server is a pool of computing devices that may be located at the same geographical location (e.g., a server room) or be distributed geographically (e.g., clouding computing, distributed computing, or in a virtual server network). In one embodiment, a server includes one or more virtualization instances such as a container, a virtual machine, a virtual private server, a virtual kernel, or another suitable virtualization instance.

The network 170 provides connections to the components of the system environment 100 through one or more sub-networks, which may include any combination of local area and/or wide area networks, using both wired and/or wireless communication systems. In one embodiment, a network 170 uses standard communications technologies and/or protocols. For example, a network 170 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 170 may be represented using any suitable format, such as hypertext markup language (HTML), extensible markup language (XML), JavaScript object notation (JSON), structured query language (SQL). In some embodiments, some of the communication links of a network 170 may be encrypted using any suitable technique or techniques such as secure sockets layer (SSL), transport layer security (TLS), virtual private networks (VPNs), Internet Protocol security (IPsec), etc. The network 170 also includes links and packet switching networks such as the Internet. In some embodiments, a data store belongs to part of the internal computing system of a server (e.g., the data store 115 may be part of the computing server 110). In such cases, the network 170 may be a local network that enables the server to communicate with the rest of the components.

Example Server Components

Figure 2:
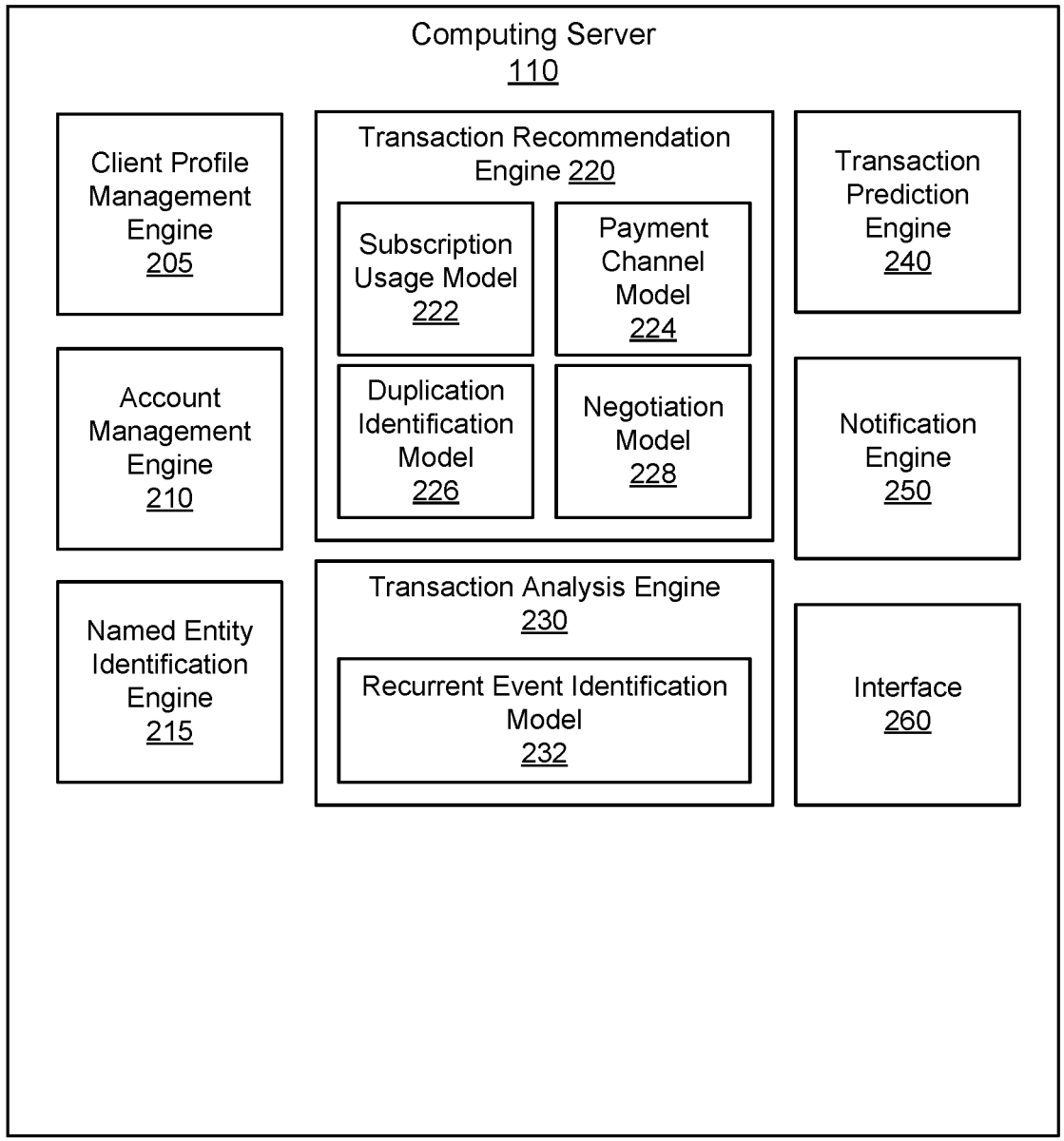
FIG. 2 is a block diagram illustrating components of an example computing server, in accordance with an embodiment.

FIG. 2 is a block diagram illustrating components of a computing server 110, in accordance with an embodiment. The computing server 110 includes a client profile management engine 205, an account management engine 210, a named entity identification engine 215, a transaction recommendation engine 220, a transaction analysis engine 230, a transaction prediction engine 240, a notification engine 250 and an interface 260. In various embodiments, the computing server 110 may include fewer or additional components. The computing server 110 also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The client profile management engine 205 stores and manages named entity data and transaction data of clients of the computing server 110. The computing server 110 serves various clients (e.g., organizational clients) that have different associated named entities such as employees, vendors, and customers. For example, the client profile management engine 205 may store the employee hierarchy of a client to determine the administrative privilege of an employee in managing a transaction. An administrator of the client may specify that certain employees from the financial department and managers have the administrative privilege to create cards, adjust subscription plans, and manage vendors for the organization. The client profile management engine 205 assigns metadata tags to transaction data of an organization to categorize the transactions in various ways, such as by transaction types, by merchants, by date, by amount, by card, by employee owner identifier, by employee groups, etc. The client profile management engine 205 monitors the spending of various transactions with respect to different vendors.

The account management engine 210 creates and manages accounts including payment accounts such as credit cards that are issued by the computing server 110. An account is associated with a named entity such as an employee and may correspond to a card such as a credit card, a prepaid card, etc. A client may use the computing server 110 to issue domain-specific payment accounts such as company cards. The client enters account information such as the cardholder's name, role and job title of the cardholder in the client's organization, limits of the card, and transaction rules associated with the card. In response, the account management engine 210 creates the card serial number, credentials, a unique card identifier, and other information needed for the generation of a payment account and corresponding card. The account management engine 210 associates the information with the cardholder's identifier. The computing server 110 communicates with a credit card company (e.g., VISA, MASTERCARD) to associate the card account created with the identifier of the computing server 110 so that transactions related to the card will be forwarded to the computing server 110 for approval.

The cards and payment accounts created by the computing server 110 may be associated with one or more transaction rules that are specified by the client's administrator or the card holder. Rules may be associated with pre-authorization and restrictions on certain transactions. Rules can be based on transaction categories, merchant categories, specific merchants, time limits, date limits, amount limits, and/or other suitable criteria, whether the criteria are permanent or temporary, dynamic or predefined, party-specific or not. For example, an administrator, who could be a designed employee or the credit card holder, in creating or editing a card, may specify a date and time limit on the card. The date and time limit can be permanent (e.g., a card being invalid after a certain time and date), periodic (e.g., a card being invalid during weekend and holidays), temporary (e.g., a card being invalid between two dates), and dynamic (e.g., a card being valid or invalid based on other triggering conditions). The administrator may also specify a transaction amount limit for each transaction. The transaction amount limit is different from the card limit. The card limit specifies the total amount that a card holder can spend for a period of time (e.g., monthly limit). The administrator may further specify a transaction amount limit for the maximum amount of spending for each transaction. In some cases, the limit of a card may also be aggregated toward a total limit of the organization. The administrator may specify various limits using a portal provided by the computing server 110. The administrator may also specify transaction category, merchant category, and specific merchants that are pre-approved or blacklisted for a specific card. The computing server 110 may impose a merchant-specific restriction on a card. For example, an administrator of a client may specify that a specific card can only be used with a specific merchant. The account management engine 210 stores various rules associated with each card as part of variables associated with the card.

The named entity identification engine 215 identifies specific named entities associated with various transactions. For a given transaction of an organizational client, there can be two or more different types of named entities involved in the transaction. For example, the transaction may be associated with a third party such as a customer or a vendor. In addition, an organization employee may be the person who caused the transaction and is responsible for the transaction. In some cases, the employee may be referred to as the owner of the transaction. The named entity identification engine 215 identifies various types of named entities in the transactions of a client.

With respect to the identification of vendors that conduct businesses with the organization client, the named entity identification engine 215 may identify merchants that are associated with the transactions. The named entity identification engine 215 may apply a model to determine the merchant that is associated with a particular transaction. The model may be a machine learning model or an algorithmic model that includes a set of rules to determine the merchant. For example, the named entity identification engine 215 parses transaction data from different clients to identify patterns in the transaction data specific to certain merchants to determine whether a transaction belongs to a merchant. In a card purchase, the transaction data includes merchant identifiers (MID), merchant category code (MCC), and the merchant name. However, those items are often insufficient to identify the actual merchant of a transaction. The MID is often an identifier that does not uniquely correspond to a merchant. In some cases, the MID is used by the POS payment terminal company such that multiple real-world merchants share the same MID. In other cases, a merchant (e.g., a retail chain) is associated with many MIDs with each branch or even each registry inside a branch having its own MID. The merchant name also suffers the same defeats as the MID. The merchant name may also include different abbreviations of the actual merchant name and sometimes misspelling. The string of the merchant name may include random numbers and random strings that are not related to the actual real-world name of the merchant. The named entity identification engine 215 applies various algorithms and machine learning models to determine the actual merchant from the transaction data. The named entity identification engine 215 may search for patterns in transaction data associated with a particular merchant to determine whether a transaction belongs to the merchant. For example, a merchant may routinely insert a code in the merchant name or a store number in the merchant name. The named entity identification engine 215 identifies those patterns to parse the actual merchant name. Examples of how a merchant is identified are discussed in further detail in association with FIG. 4. U.S. patent application Ser. No. 17/351,120, entitled real-time named entity based transaction approval, filed on Jun. 17, 2021, is incorporated by reference herein for all purposes.

The named entity identification engine 215 may also identify the employee owner with respect to a transaction as well as a vendor. The named entity identification engine 215 may suitable any suitable methods to identify the employee owner. For example, the named entity identification engine 215 may apply a model to determine the employee who should be responsible for a particular transaction or a particular vendor. The model may be a machine learning model or an algorithmic model that includes a set of rules to determine the employee owner. In some cases, with respect to a particular transaction, the model may include a rule determining that the employee who incurred the expense associated with the transaction or who caused the transaction is the owner. In some cases, the model may include a rule determining that the employee who uploaded the invoice or record associated with the transaction is the owner. With respect to a vendor, the named entity identification engine 215 may also assign an "owner," who is an employee that is primarily responsible for managing the transactions associated with the vendor. In some cases, the model may include a rule determining that the employee who spent the most with the vendor is the owner. In other cases, the model may include a rule determining that the employee who has the highest spending recently or within a specific time period is the owner. The model may also be a machine learning model that predicts the owner of a transaction or associated with a vendor. The owner automatically determined by the named entity identification engine 215 may also be manually adjusted by the client administrator.

The transaction recommendation engine 220 includes one or more models that analyze the transaction data of a client and provide recommendations to the client to improve various aspects of transactions. For example, the recommendations may be associated with savings such as reduction of costs in a particular transaction or a subscription plan. The recommendations may be referred to as saving insights.

There can be different types of recommendations that can improve the transaction efficiency of the client, such as recommendations that adjust subscription period to lower costs, recommendations that identify inefficiency in usage or duplication in a subscription period, recommendations that identify more cost-effective channels of payments, recommendations that identify lower-cost alternatives associated with particular transactions, and recommendations that initiate negotiations with vendors.

Each type of recommendation may be generated by a specific model. A model may be a machine learning model or an algorithmic model that includes a set of rules to generate a recommendation. The computing server 110 may allow clients to provide feedback on the recommendations (e.g., a recommendation being useful, not useful, and why it is not useful). The feedback may be fed back to the model to further refine the model. For example, in one case, the feedback may be used to generate labels for training samples of a machine learning model to further train the machine learning model to generate recommendations. In another case, the feedback may be used to determine the accuracy or usefulness of the model. For example, recommendations may be sent only if the feedback indicates that the usefulness rating of the recommendations to different clients exceeds a certain percentage threshold.

The transaction recommendation engine 220 may also take certain types of automatic actions based on a client adoption of a recommendation. For example, the recommendation may include a landing page and a pricing page of a vendor for the client of the computing server 110 to adjust a subscription plan based on the recommendation. The adjustment of a subscription plan may also be automatically done by the transaction recommendation engine 220. In another example, the transaction recommendation engine 220 may automatically generate notifications to administrators and employee owners of the vendor, such as a notification to two or more employees who subscribed to the same vendor service. In yet another example, the transaction recommendation engine 220 may generate a preformatted email to help the client to negotiate with a vendor after identifying a potential saving. In yet another email, the transaction recommendation engine 220 may automatically help a client to switch to a more cost saving payment channel based on the client's approval of a recommendation.

The recommendations to a particular client may be generated based on the feedback and information of other clients. For example, if a large number of clients have rated a particular type of recommendations to be unhelpful, the transaction recommendation engine 220 may stop giving a similar type of recommendation to the client. In another case, the transaction recommendation engine 220 may identify a common SaaS vendor service plan that is subscribed by a large number of clients and compare the average of the cost of the subscription plans to make recommendations to certain clients who are identified to be paying excessive costs compared to the average.

The subscription usage model 222 is an example of a recommendation model, in accordance with some embodiments. The subscription usage model 222 identifies inefficiency in a subscription plan, such as the number of licenses subscribed compared to the active usage. The computing server 110 may receive the log-in credential of an account of a client for service subscribed to a particular vendor, such as a SaaS vendor. The computing server 110 determines the number of licenses that are subscribed and compares the number to the number of active users in the organization that use the SaaS platform provided by the vendor. In turn, the computing server 110 may recommend whether to recommend increasing or decreasing the number of licenses in the subscription.

The payment channel model 224 is another example of a recommendation model, in accordance with some embodiments. Certain payment channels are more cost effective than others. For example, a client may enjoy a small percentage of cash back if a transaction is paid by a credit card instead of a direct payment such as ACH. The payment channel model 224 applies rules to identify transactions (e.g., subscription plans) that can be switched to a more cost effective payment channel. The computing server 110 may maintain a list of merchants that accept certain payment methods such as merchants that accept credit cards. The computing server 110 may be integrated with third-party teller software FINICITY to access the bank account of a client. The computing server 110 identifies transactions that are currently paid by channels such as ACH from the client's bank accounts through, for example, an API call. The computing server 110 provides recommendations to the client to switch the payment method to credit cards for merchants that accept credit cards.

The duplication identification model 226 is yet another example of a recommendation model, in accordance with some embodiments. The duplication identification model 226 may identify transactions or subscription plans that are potentially duplicative among employees of the client. For example, two employees may unknowingly make a subscription to a vendor for the same product while the license provides a company-wise access to the product. Upon identification of duplicative transactions, the computing server 110 may automatically generate a preformatted notification to both employees to allow at least one or more employees to cancel the duplicative subscription.

The negotiation model 228 is yet another example of a recommendation model, in accordance with some embodiments. The computing server 110 may identify the price that a client is paying to a particular vendor. The computing server 110 may compare the price to prices that other entities are paying. If the computing server identifies a discrepancy, the computing server 110 may initiate a negotiation with the vendor to negotiate a more reasonable price.

While four specific examples of recommendation models are described, in various embodiments, a transaction recommendation engine 220 may provide more or fewer types of recommendations.

The transaction analysis engine 230 includes one or models that analyze the transaction data associated with a client. The analysis of transaction data may include identifying named entities such as vendors and employee owners that are involved in the transaction data, identifying a subscription transaction series that exists in the transaction data, and determining the recurring frequency of the subscription transaction series. The transaction analysis engine 230 may parse unstructured transaction data to identify named entities in the data and predict that a series of transactions that are related to a vendor belong to a series. The transaction analysis engine 230 in turn may apply a recurrent event identification model 232 to determine the recurring frequency of the series. Detail of the operation of the transaction analysis engine 230 is further discussed in FIG. 3.

The recurrent event identification model 232 may take the form of a machine learning model or an algorithmic model that includes a set of rules that are used to determine the recurring frequency of a transaction series. A transaction series may be any suitable time series such as a subscription transaction series. In one case, the recurring frequency may be monthly, yearly or rolling and the recurring period may be a month, a year, etc. For example, a subscription transaction series may be a SaaS plan to which the organization client is currently subscribing and the computing server 110 automatically detects whether the subscription is on a monthly, yearly, or rolling basis. The transaction analysis engine 230, based on the identity of the vendor, may classify a plurality of transactions as a series. However, not every event in the series may in fact belong to a subscription transaction series. There could be single occurrence events that are misclassified as part of the subscription transaction series. Hence, the recurring frequency of the subscription transaction series can be challenging to determine due to the noise present in the transaction data. The transaction analysis engine 230 applies the recurrent event identification model 232 to determine the recurring frequency. Details and examples of various recurrent event identification model 232 are described with reference to FIG. 7 through FIG. 9.

The transaction prediction engine 240 predicts the timing of an upcoming transaction in a transaction series. An upcoming transaction may be an event that is predicted to occur in a transaction series. For example, in a subscription transaction series, the recurring events may be charges of payments periodically. The upcoming transaction, in this case, is the upcoming payment date. While upcoming payment dates and subscription transaction series are used as examples, the transaction prediction engine 240 may also be used to analyze other types of upcoming transactions and transaction series. The transaction prediction engine 240 identifies the last recurring event in the transaction series and adds the recurring period determined by the recurrent event identification model 232 to the date of the last recurring event to determine the date of the upcoming transaction. The transaction prediction engine 240 may also determine the amount of the payment in the upcoming payment date based on historical payment amounts, such as by averaging the historical amounts for a certain period, taking the highest historical amounts, or taking the last payment amount.

The notification engine 250 provides notifications to users in a client organization. The notification engine 250 may provide daily digests to administrators and employee owners of various vendors. A daily digest may include upcoming bills, the predicted amount of the bills, and other information related to transactions. The notification engine 250 may also generate automatic or preformatted emails that are related to one or more transaction recommendations. For example, if the computing server 110 identifies any duplicative transactions, the notification engine 250 generates a preformatted email for an administrator to send to the employees who incurred the duplicative charges.

The interface 260 includes interfaces that are used to communicate with different parties and servers. The interface 260 may take the form of a SaaS platform that provides clients with access to various functionalities provided by the computing server 110. The interface 260 provides a portal in the form of a graphical user interface (GUI) for clients to create and manage credit card accounts, manage transactions, review vendor information, and adopt or reject transaction recommendations. Examples of the GUI elements of the interface 260 are shown in FIG. 10 through FIG. 13. The interface 260 is in communication with the application 132 and provides data to render the application 132.

In one embodiment, the interface 260 also includes an API for clients of the computing server 110 to communicate with the computing server 110 through machines. The API allows the clients to retrieve the computing server 110 stored in the data store 115, send query requests, and make settings through a programming language. Various settings and functionalities of the various engines of the computing server 110 may be changed by the clients through sending commands to the API. The API allows the clients to automate various processes such as vendor management and transaction management.

Transaction Data Analysis Process

Figure 3:
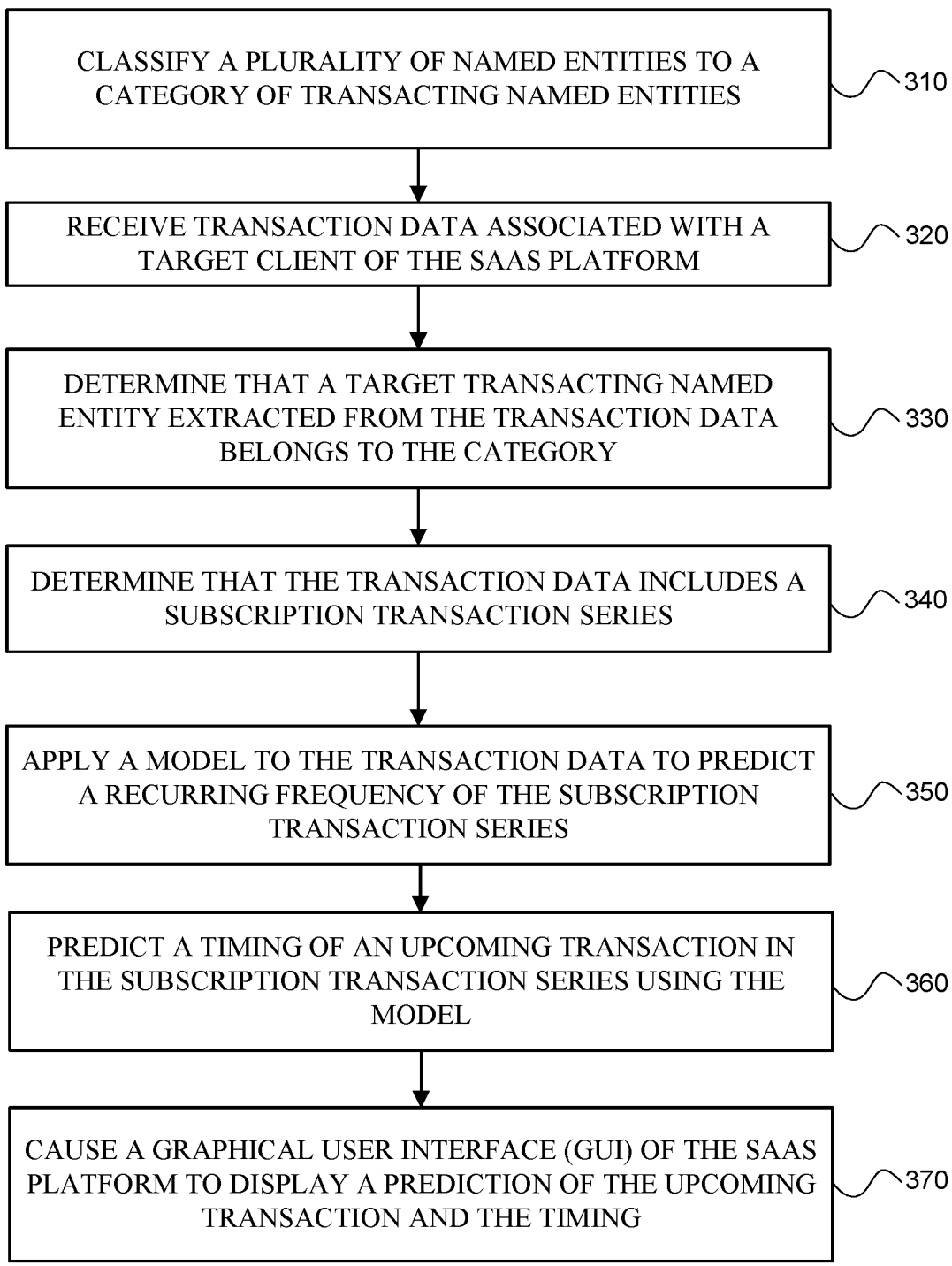
FIG. 3 is a flowchart depicting a computer-implemented process for determining recurring subscription events in transaction data, in accordance with an embodiment.

FIG. 3 is a flowchart depicting a computer-implemented process 300 for determining recurring events in transaction data, in accordance with an embodiment. While a subscription transaction series is used as an example, the transaction series may be a type that is unrelated to a subscription plan. The process 300 is related to the operation of the transaction analysis engine 230 described in FIG. 2. The computing server 110 may include a processor and memory. The memory stores computer code that includes a set of code instructions. The code instructions, when executed by the processor, cause the processor to perform some of the steps described in the process 300.

The computing server 110 classifies 310 a plurality of named entities to a category of transacting named entities. The computing server 110 may operate a SaaS platform that includes different types of clients that interact with numerous third parties. The third party identities may present in the transaction data of those clients but are not easily identifiable due to the unstructured nature of at least some of the transaction data. Also, the identities of the third party named entities may not be uniquely identified in various transaction data. The computing server 110 applies various models, such as a model described in FIG. 4, to identify the named entities in the transaction data of different clients. The computing server 110 may also classify the transacting named entities into different categories, such as customers, vendors, contractors, employees, etc. Each category may include additional sub-categories. For example, vendors may be classified into different types of merchants, such as airlines, restaurants, software services, computer hardware, etc.

The step 310 may include a plurality of substeps. An example model that may be used to carry out the step 310 is described in FIG. 4. In general, the computing server 110 receives past transaction data associated with a plurality of clients. For example, the past transaction data may be credit card transactions handled by the computing server 110, invoices and bills processed by the computing server 110, and bank statement entries that are provided to the computing server 110. The past transaction data may include unstructured data with unprocessed named entities. For example, a merchant name may not be uniform or may be abbreviated in various transaction data. The computing server 110 parses text strings representing the unprocessed named entities from the unstructured data. The computing server 110 analyzes patterns in the past transaction data to determine one or more named entity identification rules that are used to classify one or more unprocessed named entities into categories of transacting named entities. For example, the computing server 110 identifies whether a named entity is a merchant. The computing server 110 collects a list of merchant names and generates various named entity identification rules that can be used to spot the merchant in raw transaction data.

The computing server 110 receives 320 transaction data associated with a target client. The target client here may simply be a specific client. The computing server 110 may receive the transaction data over time through working with the target client. For example, the transaction data may be generated as part of credit card transactions and other types of transactions generated as the computing server 110 continues to work with the target client. The transaction data may be structured or unstructured. Unstructured data may include invoices, bills, and credit card transaction entries that have not been processed by the computing server 110. Structured data may include useful data that are tagged by metadata and/or grouped by columns or other arrangements.

The computing server 110 determines 330 that a target transacting named entity extracted from the transaction data belongs to the category. The target client may conduct businesses with a variety of third parties. The computing server 110 may identify the transacting named entities individually. The target transacting named entity may be one of the transacting named entities. The computing server 110 determines that the target transacting named entity belongs to a category. The category here may be merchants or a specific sub-category of merchants. For example, the computing server 110 identifies a merchant in a subset of transaction data. The computing server 110 determines that the transacting named entity is a merchant based on the list of merchants determined in step 310. In some embodiments, the computing server 110 further identifies that the sub-category of the merchant. For example, the computing server 110 may identify that the merchant is a software service provider.

Responsive to determining that the target transacting named entity belonging to the category, the computing server 110 determines 340 that the transaction data includes a transaction series. The nature of the transaction series may depend on the type of the target transacting named entity. For example, if the computing server 110 identifies that the target transacting named entity is a software service provider merchant, the computing server 110 determines that the transaction data associated with the target transacting named entity may include a subscription transaction series because a software service provider is often a SaaS provider. In some cases, while the transaction data associated with the target transacting named entity is classified to a series, there are data entries that do not actually belong to the series. Those data entries may be one-time charges or other side products that are provided by the merchant.

The computing server 110 applies 350 a model to the transaction data to predict a recurring frequency of the transaction series. A transaction series may include recurring events that occur regularly. For example, in a subscription transaction series, a vendor may regularly charge the target client. The invoice or payment activities are examples of recurring events in the subscription transaction series. The computing server 110 applies 350 a model to predict the recurring frequency. The frequency can be monthly, yearly, daily, rolling, etc. Various examples of models are described in FIG. 7 through FIG. 9.

The computing server 110 predicts 360 a timing of an upcoming transaction in the subscription transaction series using the model. An upcoming transaction may be an event that is predicted to occur in a transaction series. For example, in a subscription transaction series, the recurring events may be charges of payments periodically. The upcoming transaction, in this case, is the upcoming payment date. The computing server 110 identifies the last recurring event in the transaction series and adds the recurring period to the date of the last recurring event to determine the date of the upcoming transaction. The computing server 110 may also determine the amount of the payment in the upcoming payment date based on historical payment amounts, such as by averaging the historical amounts for a certain period, taking the highest historical amounts, or taking the last payment amount.

The computing server 110 causes 370 a graphical user interface (GUI) to display a prediction of the upcoming transaction and the timing. For example, the computing server 110 may provide a transaction management platform for its clients in the form of a SaaS platform. The GUI may take the form of a vendor tab that includes a list of vendors, the recurring frequency of the charges of each vendor, the timing (e.g., the date) of the upcoming transaction. The transaction information, the employee owner, the subscription payment frequency, and the upcoming payment prediction of each vendor may be determined by repeating one or more steps described in the process 300 with each vendor being the target transacting named entity. The data that includes various vendors of the client may be transmitted to the client device 130 and displayed in a GUI. The data may be illustrated in various forms, such as a tabular form, a line chart, or a bar chart. The client may sort the vendors by various fields including the chronological order of upcoming payments. Examples of various GUI portals for vendor management are illustrated in FIG. 10 through FIG. 13.

Transacting Named Entity Identification Process

A named entity identification process may be used to determine the identities of transacting named entities included in transaction data. In one embodiment, the computing server 110 determines one or more named entity identification rules by analyzing patterns in the volume of data associated with the plurality of clients. For example, the volume of data may include past transaction data of different clients. The computing server 110 may analyze the past transaction data to determine a common pattern associated with a particular named entity. A named entity identification rule may specify, for example, the location of a string, the prefix or suffix to be removed, and other characteristics of the data include in one or more noisy data fields. A noisy data field is a field that includes information more than the named entity. For example, a noisy data field may include a representation of a named entity, such as the name, an abbreviation, a nickname, a subsidiary name, or an affiliation of the named entity. The noisy data field may further include one or more irrelevant strings that may be legible but irrelevant or may even appear to be gibberish. The computing server 110 parses the representation of the named entity based on the named entity identification rule. This general framework may be used in one or more models to identify transacting named entities in transaction data.

Figure 4:
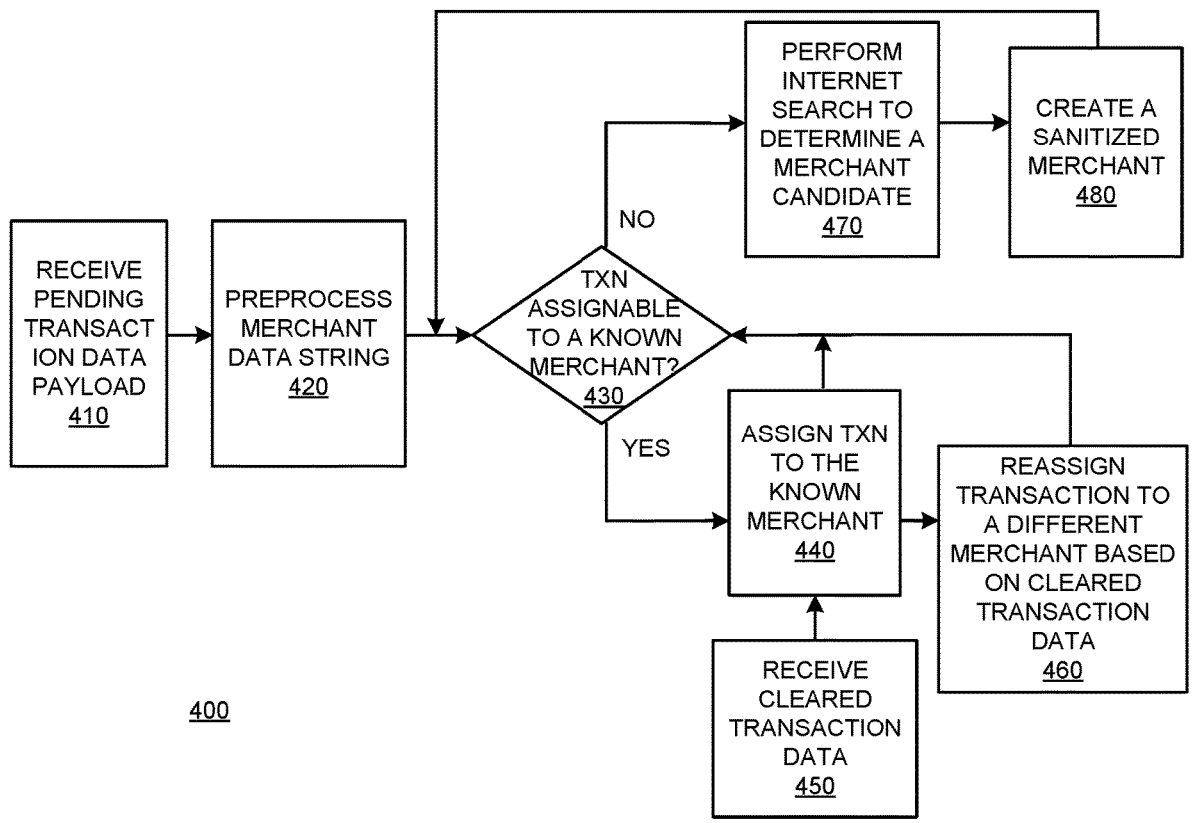
FIG. 4 is a flowchart depicting a computer-implemented process for identifying real-world identities of named entities from transaction data, in accordance with an embodiment.

FIG. 4 is a flowchart depicting a computer-implemented process 400 for identifying real-world identities of transacting named entities from transaction data, in accordance with an embodiment. The process 400 illustrated in FIG. 4 is an example of the foregoing framework. The process 400 may be used in step 310 to categories transacting named entities. The process 400 may be a set of rules that are included in a model that may be executed by the computing server 110. While identifying merchants is used as an example in FIG. 4, the general process may be used for other named entity identifications.

The computing server 110 receives 410 pending transaction data. A transaction may be associated with two types of transaction data, one representing the pending transaction and another representing the cleared transaction. The transaction data includes various fields, such as the card numbers, the MID, the MCC, the merchant name, zip code, and a transaction identifier. For example, a pending transaction data from a merchant named "ABCD" may include (ACD* PENDING.ABCD.COM, 023320212, 5423, 41211), which respectively represents a noisy string of merchant name "ACD* PENDING.ABCD.COM," a MID 023320212, an MCC 5423 and a zip code 41210. The string of merchant name includes a prefix ACD*, which is a non-standardized abbreviation of the merchant name. In another example, a pending transaction data from a merchant named "GIO ICE CREAM" may include (SK *GIO ICE CREAM SAN RAM, 25255899442270, 5499, 94584), which respectively represents a noisy string of merchant name "SK *GIO ICE CREAM SAN RAM," a MID 25255899442270, an MCC 5499, and a zip code 94584. The string of merchant name includes a prefix SK *, which may be related to the POS company that sets up the registry for the merchant. The string of merchant name may also include an incomplete city name of the branch of the merchant "SAN RAM."

The computing server 110 pre-processes 420 merchant data strings. Various algorithms may be used to pre-process the merchant data string, such as the merchant name string. For example, a first function may detect whether a prefix exists in the merchant name string. The computing server 110 may store a list of known prefixes that are associated with various POS companies and common retailers that may not be the true merchant. The computing server 110 locates the prefix and removes it from the string. Another function may determine whether a part of a string is likely to be the name of the merchant. For example, the function may identify the count of numbers in a word compared to the length of the word. If the count to length ratio is higher than a threshold or the word includes entirely numbers, the computing server 110 may determine that the word is not part of a merchant name and remove the word from the string. The computing server 110 may also include other functions that identify known words and common words in the merchant name string. For example, the functions may locate known cities and landmarks in the merchant name string. The computing server 110 may also store a list of known merchants and data of how their names, abbreviations, or alias usually appear in a merchant name string.

The computing server 110 determines, at decision stage 430, whether the transaction can be assigned to a known merchant. The computing server 110 may store an existing merchant name table that includes common ways of how names of known merchants appear in transaction data, patterns of the transaction data, lists of known MID and MCC associated with a known merchant, etc. In some cases, an incoming transaction data matches a data entry in the existing merchant name table with respect to the MID, the MCC, the zip code and the parsed merchant name in the merchant name string. In other cases, the parsed merchant name matches a data entry in the existing merchant name table and the pattern of the transaction data also matches the typical pattern of the merchant. In those cases, the computing server 110 determines that the transaction belongs to a known merchant. The existing merchant name table may be constructed from thousands of or even millions of verified transaction data associated with different clients of the computing server 110. The computing server 110 can identify merchants based on the collective data from various transactions of different clients. The computing server 110 may analyze a large number of past transaction data to generate various named entity identification rules.

In response to the computing server 110 being able to assign the transaction to a known merchant, the computing server 110 assigns 440 the transaction to the known merchant. If the identification of the merchant is associated with a transaction process (e.g., the authorizer server 160 performing the process 400), the server compares the identified merchant to a whitelist or blacklist of merchants specified in the transaction rule of the card. The server in turn approves or denies the pending transaction.

In some cases, the computing server 110 also receives 450 cleared transaction data. A cleared transaction data includes the same transaction data identifier as the pending transaction data, but may include different information that may help the computing server 110 to further identify or verify the identity of the merchant. For example, in some cases, a large merchant may engage in different business activities through multiple subsidiaries. The pending transaction data in some cases do not contain the nature of the transactions or the identity of the subsidiary. The cleared transaction data may include additional information such as the identity of the subsidiary. Based on the additional information, the computing server 110 may reassign 460 the transaction to a different merchant based on the cleared transaction data. The results of the assignments of a known merchant or re-assignment of the known merchant are fed back to the existing merchant name table to further enrich the table.

In response to the computing server 110 not being able to assign the transaction to a known merchant, the computing server 110 performs 470 an Internet search to determine a merchant candidate. The Internet search may be based on the parsed merchant name in the merchant name string, location information, the zip code, the MCC, and any suitable combination thereof. The Internet search may identify an Internet domain that is associated with an unknown merchant name and automatically determine the identity of the merchant.

The computing server 110 creates 480 a sanitized merchant identity. The sanitization process may be based on a verification of the merchant name from the merchant's website, the use of public databases such as maps and addresses, and other suitable processes to identify the identity of a real-world merchant. In some cases, the sanitization process may also involve a manual process for a person to provide the merchant information. When a merchant candidate is not identified by the Internet search or the confidence of the merchant candidate is low, the algorithm may flag the merchant candidate for a manual review. The results of the sanitized merchant are fed back to the existing merchant name table to enrich the table. The table may include different lists of various sub-categories of merchants. As such, the computing server 110 maintains a list of different categories of transacting named entities.

Figure 5:
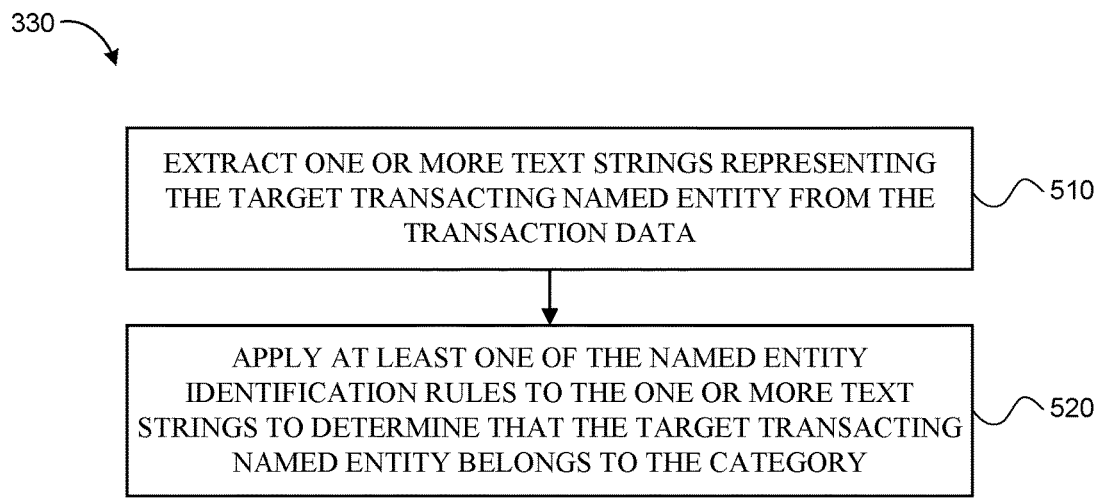
FIG. 5 is a flowchart depicting a computer-implemented process for identifying a category of named entity from transaction data, in accordance with an embodiment.

FIG. 5 is a flowchart depicting a computer-implemented process 500 for identifying a category of a target named entity from transaction data, in accordance with an embodiment. The process 500 may be an example of sub-steps in the step 330 in process 300, in which the computing server 110 determines that a target transacting named entity extracted from the transaction data belongs to a category of named entity. For example, the computing server 110 determines that a vendor is a software service merchant. In process 500, the computing server 110 extracts 510 one or more text strings representing the target transacting named entity from the transaction data. The computing server 110 applies 520 at least one of the named entity identification rules to the one or more text strings to determine that the target transacting named entity belongs to the category. A named entity identification rule may be generated using the process 400. Using a named entity identification rule, the computing server 110 determines the real-world identity of the target transacting named entity. In turn, the computing server 110 can determine a category of named entity to which the target belongs.

Transaction Improvement Recommendation Process

Figure 6:
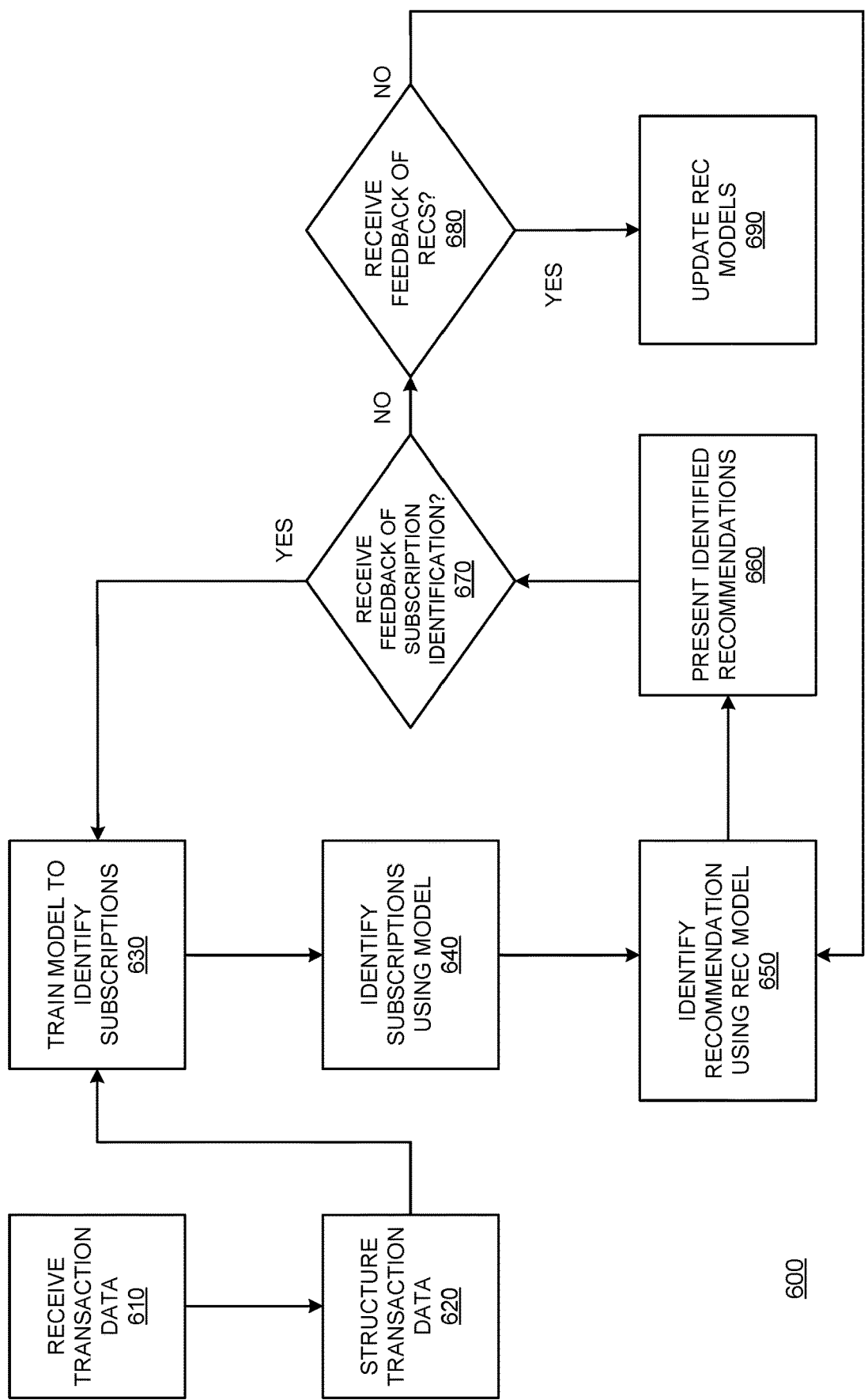
FIG. 6 is a flowchart depicting a computer-implemented process for determining and refining transaction improvement recommendations, in accordance with an embodiment.

FIG. 6 is a flowchart depicting a computer-implemented process 600 for determining and refining transaction improvement recommendations, in accordance with an embodiment. One or more steps in process 600 may correspond to the operation of the transaction recommendation engine 220. A transaction improvement recommendation may sometimes be referred to as a saving insight, but other types of recommendations that can be used to improve the transaction efficiency and cost of the client may also be possible.

By way of example, the computing server 110 receives 610 transaction data. The transaction data received step 610 may be specific to a target client. However, the computing server can repeat the process 600 for different clients. The computing server 110 structures 620 transaction data. For example, the computing server 110 may provide metadata tags to different data fields, identify transacting named entities in the raw transaction data, classify the transaction data into one or more series, and arrange data into different data columns. The computing server 110 trains 630 a model to identify subscriptions or other transaction series in the transaction data. The model may be a machine learning model or an algorithmic model that includes a set of rules. Various examples of the model are discussed in FIG. 7 through FIG. 9. The computing server 110 identifies 640 subscriptions using the model.

The computing server 110 may use different sets of models to identify 650 transaction improvement recommendations such as saving insights. The models used to generate recommendations are referred to as recommendation models. Examples of recommendation models, discussed in FIG. 2, include subscription usage model 222, payment channel model 224, duplication identification model 226, and negotiation model 228. Each model may be specialized in generating one type of recommendations. The computing server 110 can include other models in addition to those explicitly discussed.

The computing server 110 presents 660 the identified recommendations to the clients. The recommendations may be presented in a GUI under a board may be referred to as a "saving insight" board. Each recommendation may be of a different type and may be specific to a transaction or a vendor. For example, a first example may be a recommendation to the client to switch from a monthly plan to a yearly plan of a subscription to reduce the subscription fee. A second example may be a recommendation to cancel duplicative subscriptions that are purchased by two different employees. A third example may be a recommendation to negotiate with a vendor because the computing server 110 determines, based on data from other clients, that the current client is overpaying the vendor. The fourth example may be a saving insight with respect to a particular transaction such as insight on an alternative flight that reduces the airfare. A fifth example may be a recommendation to turn a recurring payment from ACH payment to credit payment to earn cash back. These are merely non-limiting examples.

In some embodiments, the computing server 110 includes one or more feedback mechanisms to improve the models used in the process 600. For example, the computing server 110 may receive 670 feedback of subscription identification. The feedbacks are used to further refine or train the model that is used to identify subscription and other transaction series. The computing server 110 may also receive 680 feedback of the recommendations provided to a client. For example, in a portal that provides the recommendations, a client may select a recommendation and provide a feedback with respect to whether the recommendation is helpful or not helpful. If the recommendation is not helpful, the client may also provide specific reasons as to why the feedback is not helpful. In turn, the computing server 110 uses the feedback data to update 690 or train the existing recommendation models.

Recurring Frequency Determination Process

Figure 7:
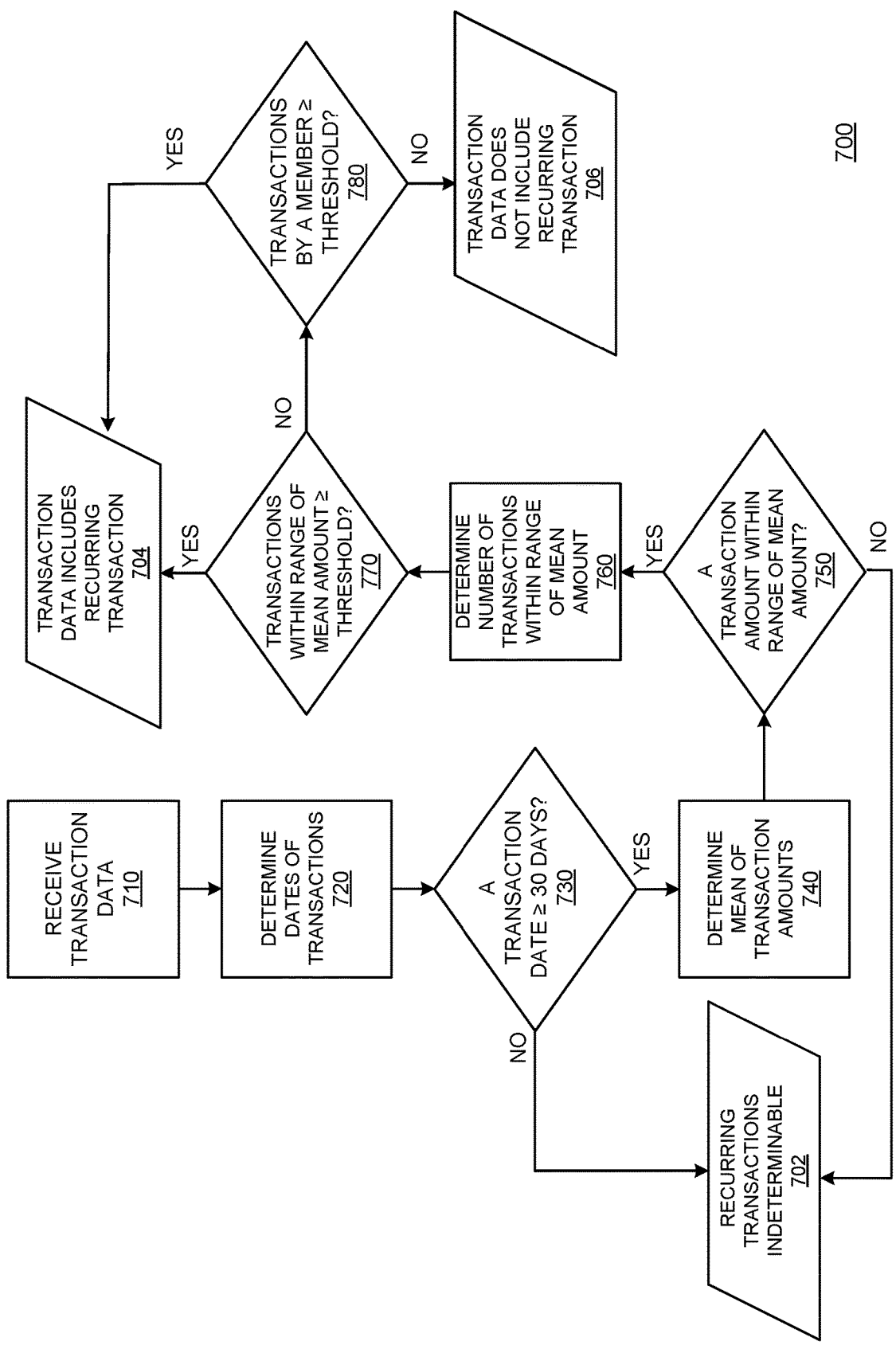
FIG. 7 illustrates a flowchart depicting a computer-implemented model that includes a set of rules to determine whether a transaction series includes recurring transactions, in accordance with an embodiment.

FIG. 7 illustrates a flowchart depicting a computer-implemented model 700 that includes a set of rules to determine whether a transaction series includes recurring transactions, in accordance with an embodiment. The transaction series used in this example is a subscription transaction series. The model 700 may correspond to part of the recurrent event identification model 232 and may be used in step 350 in process 300.

In some embodiments, the computing server 110 receives 710 transaction data of a client. The transaction data received may be specific to a particular client and a particular transacting named entity. For example, the transaction data may be a subset of transaction data that is separated from other transaction data in step 340 of the process 300. For example, the computing server 110 may use transactions of a particular vendor in the model. Those transactions may be classified as a subscription transaction series. The transaction data of a client may include other transaction series with respect to other vendors. The computing server 110 may repeatedly apply the model 700 to determine the recurring frequency associated with each vendor.

The computing server 110 determines 720 dates of transactions. While the transactions are preliminarily determined to be in a series, the series may include a number of transactions that are non-recurring and do not belong to the series. The computing server 110 uses the rest of steps in model 700 to determine the recurring frequency of the subscription transaction series. The model 700 may take the form of a heuristic algorithm.

The computing server 110 determines 730 whether any of the transactions in the series is older than a threshold number of days (e.g., 30 days or 33 days). Responsive to determining that none of the transactions is older than the threshold number of days, the computing server 110 determines 702 that the series is indeterminable with respect to whether there are recurring transactions because all of the transactions are too new to be determined whether they will be recurring.

Responsive to there is at least one transaction that is older than the threshold number of days, the computing server 110 determines 740 the average of the transaction amounts. The computing server 110 in turn determines 750 wherein there is at least a transaction that is within a range of the average amount. The range may be a percentage range or standard deviation range. The range may be predetermined and centered on the average amount. If there is no transaction that is within the range, the computing server 110 determines 702 that the series is indeterminable with respect to whether there are recurring transactions.

Responsive to there is at least one transaction that is within the range, the computing server 110 determines 760 the number of transactions that have the transaction amounts within the range of the average amount. The computing server 110 determines 770 whether the number of transactions that are within the range is larger than a threshold. Responsive to there are more than the threshold number of transactions whose amounts are within the range, the computing server 110 determines 704 that the transaction data includes recurring transactions. Responsive to determining there are fewer than the threshold number of transactions whose amounts are within the range, the computing server 110 determines whether the number of transactions that are incurred by a member is greater than a threshold. The threshold in the step 780 may be the same or different from the threshold in the step 770. One or more of these thresholds may be predetermined. The threshold in the step 770 may be referred to as a "threshold number of transactions" and the threshold in the step 780 may be referred to as a "threshold number of member-incurred transactions." A member here may be an employee. Responsive to there are more than the threshold number of transactions that are incurred by the same person, the computing server 110 determines 704 that the transaction data includes recurring transactions. Otherwise, the computing server 110 determines 706 that the transaction data does not include recurring transactions.

Figure 8:
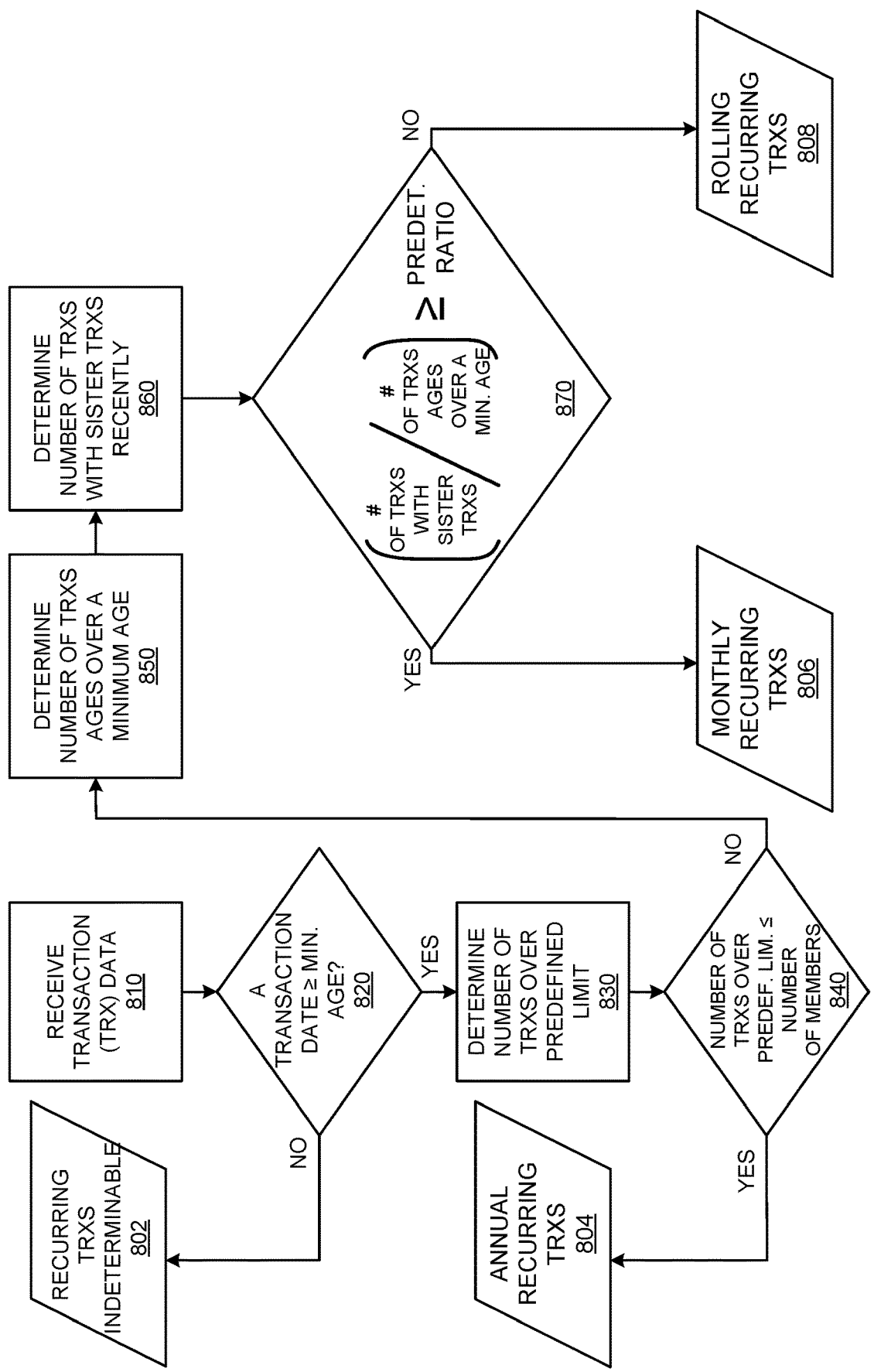
FIG. 8 illustrates a flowchart depicting a computer-implemented model that includes a set of rules to determine recurring frequency of a subscription transaction series, in accordance with an embodiment.

FIG. 8 illustrates a flowchart depicting a computer-implemented model 800 that includes a set of rules to determine the recurring frequency of a subscription transaction series, in accordance with an embodiment. Similar to the model 700, the model 800 may also correspond to part of the recurrent event identification model 232 and may be used in step 350 in process 300. In some embodiments, the model 800 may be a continuation of the model 700. In some embodiments, the models 700 and 800 are part of the same model. The model 800 may also be a heuristic algorithm.

The computing server 110 receives 810 transaction data and determines 820 whether any of the transactions in the transaction is older than a threshold number of days. The steps 810 and 820 are similar to step 710 through 730 in the model 700. For example, the transaction data received may be specific to a target transacting named entity. Responsive to determining that none of the transaction is older than the threshold number of days, the computing server 110 determines 802 that the series is indeterminable with respect to whether there are recurring transactions. Responsive to determining that there is at least one transaction being older than the threshold number of days, the computing server 110 determines 830 the number of transactions whose amounts are larger than the predefined limit 830. The predefined limit may be a level relative to the average or a fraction of the maximum amount in the transaction data. For example, in one case, an example predefined limit is a quarter of the maximum amount, but the predefined limit in other embodiments may also be other numbers. The computing server 110 in turn determines 840 whether the number of transactions that are over the predefined limit is smaller than the number of members who have transaction records with the vendors. Responsive to the number of transactions that are over the predefined limit is smaller than the number of members, the computing server 110 determines 804 that the recurring frequency is yearly.

Responsive to the number of transactions that are over the predefined limit is larger than the number of members, the computing server 110 determines 850 the number of transactions that are older than the threshold number of days. The threshold number of days in step 850 may be the same threshold number of days used in the step 820. The computing server 110 also 860 determines the number of transactions with sister transactions recently. A sister transaction may be a transaction whose amount is in the same range as a transaction that is older than the threshold number of days. Recent transactions may refer to transactions that are younger than the threshold number of days. In turn, the computing server 110 calculates a ratio of the number of older transactions that have recent sister transactions to the total number of older transactions (e.g., transactions that are older than the threshold number of days). The computing server 110 compares 870 the ratio to a predetermined ratio (e.g., 0.5 or 0.6). Responsive to determining that the ratio is larger than the predetermined ratio, the computing server 110 determines 806 that the recurring frequency is monthly. Responsive to determining that the ratio is smaller than the predetermined ratio, the computing server 110 determines 808 that the recurring frequency is rolling.

While one or more models that include sets of rules may be used to identify whether a transaction series include recurring transactions and the recurring frequency of the series, machine learning models may also be used to make those determinations. An example of the machine learning model is discussed in FIG. 9.

Machine Learning Models

Alternative to or in addition to various rule-based models, the computing server 110 may also use machine learning models to make determinations in providing recommendations, identifying categories of transacting named entities, and determining recurring frequency in a transaction series. The computing server 110 may accumulate a large number of transaction data through various processes described herein with different clients. The computing server 110 may use the past transaction data as a set of training samples to iteratively train one or more machine learning models that can be used to identify an identity of a transacting named entity. The computing server 110 may also generate another set of training samples to iteratively train other machine learning models that can be used to predict the recurring frequency of a transaction series. Furthermore, the computing server 110 may train additional machine learning models that can be used to provide transaction improvement recommendations to a client.

A training sample may include a label for supervised training. The label may be generated by a manual process or by an automatic process such as the process 400 or the models 700 and 800. For example, in training a model that is used to identify a merchant, the training samples may include known past transaction data with the identities of the merchant as labels. In training a model that is used to determine the recurring frequency of a transaction series, a training sample may be a time series of transaction data and the label may be the recurring frequency that is determined by model 800. In training a recommendation model, the feedback label "helpful" or not "helpful" may also be used to train or refine a recommendation model. In some cases, part of the training samples includes labels while other training samples do not include labels but are grouped with labeled samples through a process such as clustering and word embeddings.

In various embodiments, a wide variety of machine learning techniques may be used. Examples of which include different forms of unsupervised learning, clustering, embeddings such as word embeddings, support vector regression (SVR) model, random forest classifiers, support vector machines (SVMs) such as kernel SVMs, gradient boosting, linear regression, logistic regression, and other forms of regressions. Deep learning techniques such as neural networks, including convolutional neural networks (CNN), recurrent neural networks (RNN), and long short-term memory networks (LSTM), may also be used. Each transaction dataset may be converted to a feature vector that includes different dimensions. By way of example, strings in the transaction data may be converted to word embeddings using known techniques Word2Vec or another technique. The word embeddings can be one or more dimensions of the feature vector. Other data fields may be turned into various dimensions of a feature vector representing a transaction data. The feature vectors can be inputted into the machine learning model to iteratively train the machine learning model. A series of transactions may also be converted to a time series.

In various embodiments, the training techniques for iteratively training a machine learning model may be supervised, semi-supervised, or unsupervised. In supervised training, the machine learning algorithms may be trained with a set of training samples that are labeled. For example, a past transaction data can be associated with a label. The labels for each training sample may be binary or multi-class. In some cases, an unsupervised learning technique may be used. The samples used in training are not labeled. Various unsupervised learning techniques such as clustering may be used. In some cases, the training may be semi-supervised with the training set having a mix of labeled samples and unlabeled samples.

A machine learning model is associated with an objective function, which generates a metric value that describes the objective goal of the training process. For example, the training intends to reduce the error rate of the model in generating predictions of the results (whether the result is the identity of a merchant in one model, the recurring frequency in another model, helpfulness of a recommendation in a recommendation model). In such a case, the objective function may monitor the error rate of the machine learning model. In transaction series analysis, the objective function of the machine learning algorithm may be the value different in predicting the recurring frequency in a training set. Such an objective function may be called a loss function. Other forms of objective functions may also be used, particularly for unsupervised learning models whose error rates are not easily determined due to the lack of labels. In various embodiments, the error rate may be measured as cross-entropy loss, L1 loss (e.g., the absolute distance between the predicted value and the actual value), L2 loss (e.g., root mean square distance).

Figure 9:
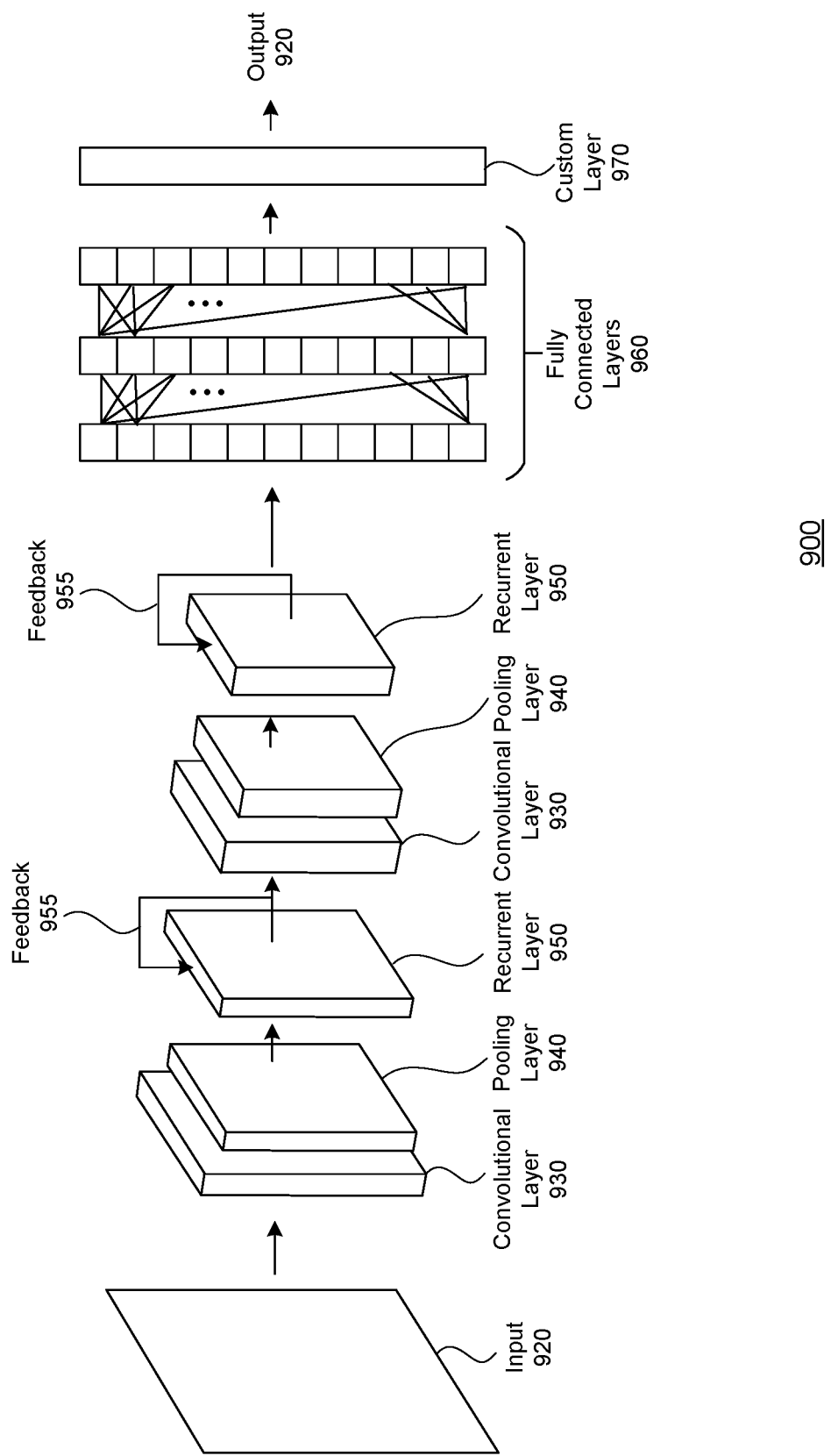
FIG. 9 is a conceptual diagram illustrating a machine learning model, in accordance with an embodiment.

Referring to FIG. 9, a structure of an example neural network (NN) is illustrated, according to an embodiment. While the structure of a neural network is illustrated as an example, the machine learning model may also be another model such as an SVM, a random forest model, or another suitable model. The NN 900 may receive an input 910 and generate an output 920. The NN 900 may include different kinds of layers, such as convolutional layers 930, pooling layers 940, recurrent layers 950, full connected layers 960, and custom layers 970. A convolutional layer 930 convolves the input of the layer with one or more kernels to generate convolved features. Each convolution result may be associated with an activation function. A convolutional layer 930 may be followed by a pooling layer 940 that selects the maximum value (max pooling) or average value (average pooling) from the portion of the input covered by the kernel size. The pooling layer 940 reduces the spatial size of the extracted features. In some embodiments, a pair of convolutional layer 930 and pooling layer 940 may be followed by a recurrent layer 950 that includes one or more feedback loop 955. The recurrent layer 950 may be gated in the case of an LSTM. The recurrent layer 950 may be particularly useful in analyzing series such as a transaction series. The feedback 955 may be used to account for temporal relationships of the transactions in a process model 222. The layers 930, 940, and 950 may be followed in multiple fully connected layers 960 that have nodes (represented by squares in FIG. 9) connected to each other. The fully connected layers 960 may be used for classification and object identification. In one embodiment, one or more custom layers 970 may also be presented for the generation of a specific format of output 920.

The order of layers and the number of layers of the NN 900 in FIG. 9 is for example only. In various embodiments, a NN 900 includes one or more convolutional layer 930 but may or may not include any pooling layer 940 or recurrent layer 950. If a pooling layer 940 is present, not all convolutional layers 930 are always followed by a pooling layer 940. A recurrent layer may also be positioned differently at other locations of the NN. For each convolutional layer 930, the sizes of kernels (e.g., 3×3, 5×5, 7×7, etc.) and the numbers of kernels allowed to be learned may be different from other convolutional layers 930. In some embodiments, the NN 900 does not include any convolutional layers.

A machine learning model includes certain layers, nodes, kernels, and/or coefficients. Training of a machine learning model, such as the NN 900, includes iterations of forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network may each also be associated with an activation function that decides the weight of the output of the node in forward propagation. Common activation functions may include step functions, linear functions, sigmoid functions, hyperbolic tangent functions (tanh), and rectified linear unit functions (ReLU). After input is provided into the neural network and passes through a neural network in the forward direction, the results may be compared to the training labels or other values in the training set to determine the neural network's performance. The process of prediction may be repeated for other transactions in the training sets to compute the value of the objective function in a particular training round. In turn, the neural network performs backpropagation by using gradient descent such as stochastic gradient descent (SGD) to adjust the coefficients in various functions to improve the value of the objective function.

Multiple iterations of forward propagation and backpropagation may be performed. Training may be completed when the objective function has become sufficiently stable (e.g., the machine learning model has converged) or after a predetermined number of rounds for a particular set of training samples. Different machine learning models may be trained for different purposes. The machine learning models may be used in named entity identification engine 215, transaction recommendation engine 220, and transaction analysis engine 230. For example, a trained machine learning model for determining recurring frequency may be used in step 350 in the process 300.

Graphical User Interfaces

FIG. 10 is a recurring transaction and named entity management portal 1000, in accordance with an embodiment. The computing server 110 causes the portal 1000 to be generated as a GUI (e.g., the interface 260) where clients can monitor transactions made by an organization's employees. An employee of an organization may request various transactions using an end user transaction device (e.g., the end user transaction device 120), owning those transactions as the requestor or initiator. The computing server 110 may detect the employee owner of a transaction, as discussed in FIG. 2. A client, such as a manager of the employee or a transaction supervisor at the employee's organization (e.g., an accounting department), may use the portal 1000 to monitor transactions made by employee owners (e.g., records of past transactions or predicted upcoming transactions). Employee owners may request recurring transactions from vendors in addition to non-recurring transactions (e.g., baseball tickets for a social event). The computing server 110 monitors and identifies the recurring transactions among employee owners' transactions. As shown in FIG. 10, the computing server 110 can cause a summary of recurring transactions by each vendor to be generated in the portal 1000.

The recurring transaction and named entity management portal 1000 includes an account management menu 1020 with navigation tabs to various management interfaces for transaction recommendations ("Insights"), transactions ("Transactions"), and end user transaction devices ("Cards"). The GUI shown in FIG. 10 depicts a management interface for recurring transactions associated with vendors, which can be navigated to through the "Vendors" navigation tab 1021. The portal 1000 includes a table 1010 of vendors with which recurring transactions are being made by employee owners. Each vendor in the table 1011 is listed in a row along with columns for the corresponding employee owner who made a transaction with the vendor, the total amount spent in all recurring transactions between the vendor and the employee owner, the amount spent within the last thirty days between the vendor and the employee owner, predicted next payment to the vendor by the employee owner (e.g., as predicted using the transaction prediction engine 240), frequency of the recurring transactions (e.g., as determined using the transaction analysis engine 230), department of the organization to which the employee owner belongs, and office of the organization at which the employee owner is located. The columns depicted in the table 1010 are examples of characterizing aspects of a recurring transaction that may be provided to the client and used to sort the recurring transactions. For example, a client may sort the transactions by the dates of the upcoming transactions so that the client can see upcoming payments in chronological order. The client may use search and filter field 1011 to specify a string (e.g., a vendor name) for which the client wishes to find in the table 1010. The computing server 110 may receive the client-specified string, search through the data provided in the table 1010, and display the recurring transactions associated with the string (e.g., having a matching string with the client-specified string). Thus, the computing server 110 may filter the recurring transaction data shown in the table 1010 to provide results relevant to a client's query provided in the field 1011. The data provided in the table 1010 may be obtained from the client profile management engine 205.

A client may use the recurring transaction and named entity management portal 1000 to edit the transactions made with a vendor in the table 1010 of vendors. The computing server 110 provides edit buttons 1012 and 1013 within the table 1010 to allow the user to modify an entry in the table. For example, a client may select the edit button 1012 to reassign the recurring transactions to another employee owner of the organization. In another example, a client can select the edit button 1013 to adjust the frequency at which a recurring transaction is made (e.g., switching from annual to monthly payments or vice versa). The edit buttons 1012 and 1013 may be embodiments of user input fields. Selection of either of the edit buttons 1012 or 1013 may cause the computing server 110 to change the GUI elements displayed to the client. For example, in response to a client selecting the edit button 1012 to change the employee owner assigned to request recurring transactions from a communication platform vendor, the computing server 110 may cause an interface to be generated listing the employee owners (e.g., navigating the client to the "People" management interface, which has a navigational tab displayed in the menu 1020). In some embodiments, a client may edit the amount spent with a vendor through an edit button on the table 1010. For example, although not depicted, an edit button may be generated in the "Next Payment" column that allows a client to limit the amount spent on a next payment with the vendor (e.g., arrange an amortized loan with the vendor where the next payment is less than the payment due). In another example, a client may edit the amount spent with a vendor by changing the frequency of the recurring payments from monthly to yearly, which may reduce costs.

A client or an employee owner of a vendor may impose restrictions on the spending associated with the vendor. For example, the client or owner can click on the vendor and open the card that is responsible for the recurring payment of the vendor. The client or owner can impose various restrictions that are discussed in association with the account management engine 210 discussed in 210. For example, the client or owner may decide to stop the card or impose a vendor specific spending restriction for each charge. The client or owner may also impose a cap on the total charge.

FIG. 11 is a transaction summary portal 1100, in accordance with an embodiment. The computing server 110 may provide notifications to a client regarding an organization's recurring transactions. The notifications may provide information such as large recurring transactions, upcoming recurring transactions, employee owners who have newly requested recurring transactions, outlier recurring transactions, or any suitable alert related to recurring transactions. The notifications provided in the portal 1100 may include a summary of transactions monitored by the computing server 110 or of the analysis performed by the computing server 110 on the monitored transactions. For example, the portal 1100 shows a summary of large recurring transactions made by employee owners for a talent recruitment vendor and marketing vendor. Additionally, the portal 1100 shows a summary of predicted recurring transactions. The computing server 110 may provide this notification to the user in an interface hosted by the computing server 110 (e.g., a website for which account holders with accounts managed by the account management engine 210 may access). In some embodiments, the information summarized in the notification may be provided through other communication platforms that operate independently of the computing server 110 (e.g., email, instant messaging, short message service (SMS)). In some embodiments, the transaction summary portal 1100 may include a notification summarizing the total spending amount between a vendor and an employee owner. The computing server may identify a vendor among the transaction data analyzed by the transaction analysis engine 230 and aggregate the amount for each transaction in the series of recurring transactions. The notifications provided in the portal 1100 may be provided using the notification engine 250.

Figure 12:
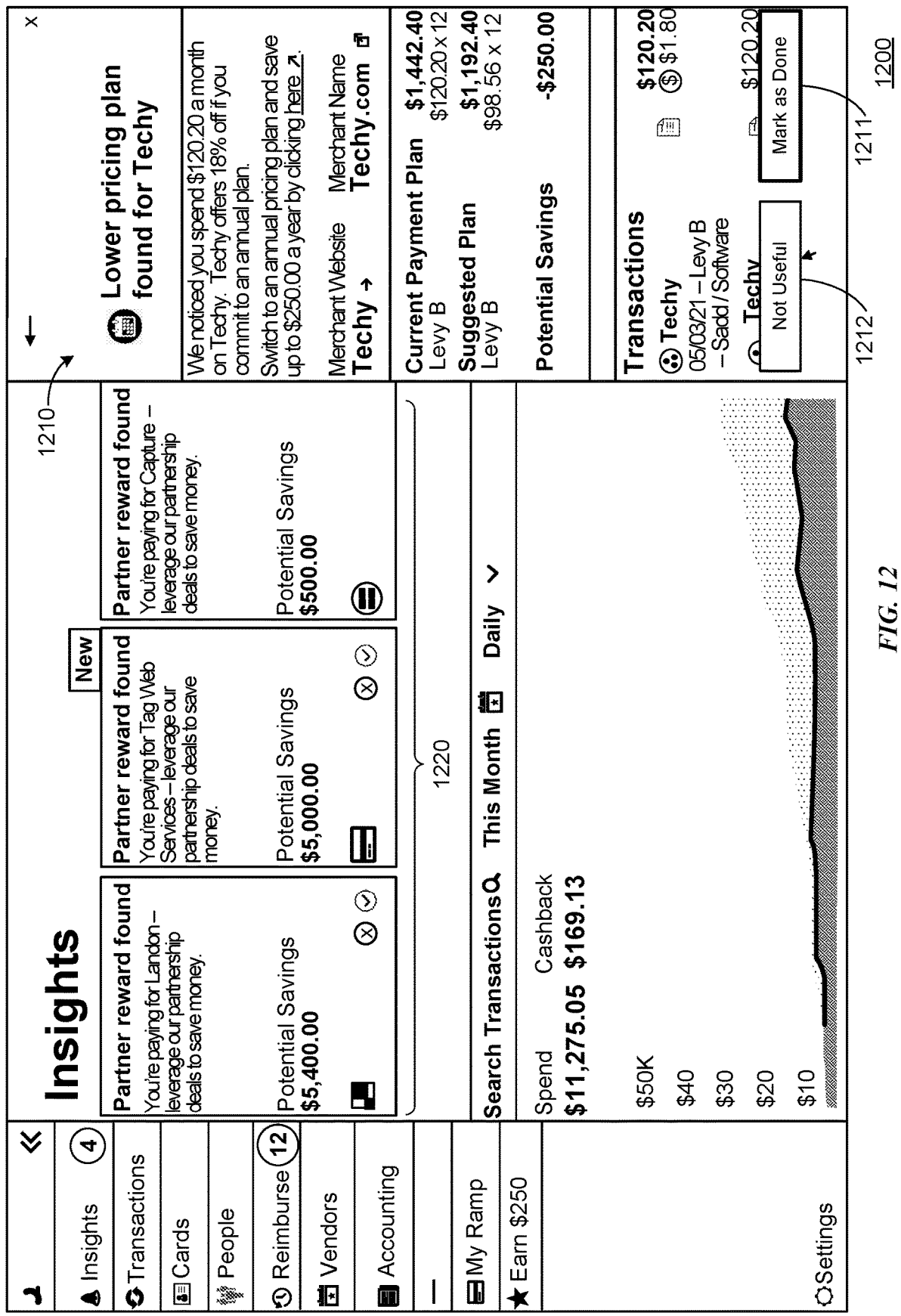
FIG. 12 is a transaction insight portal, in accordance with an embodiment.

FIG. 12 is a transaction insight portal 1200, in accordance with an embodiment. The transaction insight portal 1200 is a GUI that the computing server 110 may cause to be generated (e.g., in a web browser) that includes a transaction recommendation panel 1210 and a transaction recommendation selection panel 1220. The portal 1200 may be a management interface accessible through the same interface (e.g., website) caused to be generated by the computing server 110 as the recurring transaction and named entity management portal 1000. The transaction recommendation panel 1210 includes a recommended transaction for a vendor with which an employee owner has a recurring transaction in place and buttons 1211 and 1212 for accepting and rejecting the recommendation. The determination of the recommended transaction that is displayed in the panel 1210 is described in further detail in the descriptions of FIGS. 2 and 6. Using feedback from the user's selection of either buttons 1211 or 1212, the computing server 110 may update one or more models used (e.g., by the transaction recommendation engine 220) to determine a transaction recommendation. The use of the feedback provided through the portal 1200 to update models for determining transaction recommendations may be an automatic action that is performed periodically or in response to receiving a predefined amount of user feedback. For example, the computing server may automatically update a model after the client has selected the button 1212 to reject a recommendation more than 60% of the time that the recommendation associated with a particular vendor has been presented.

Figure 13:
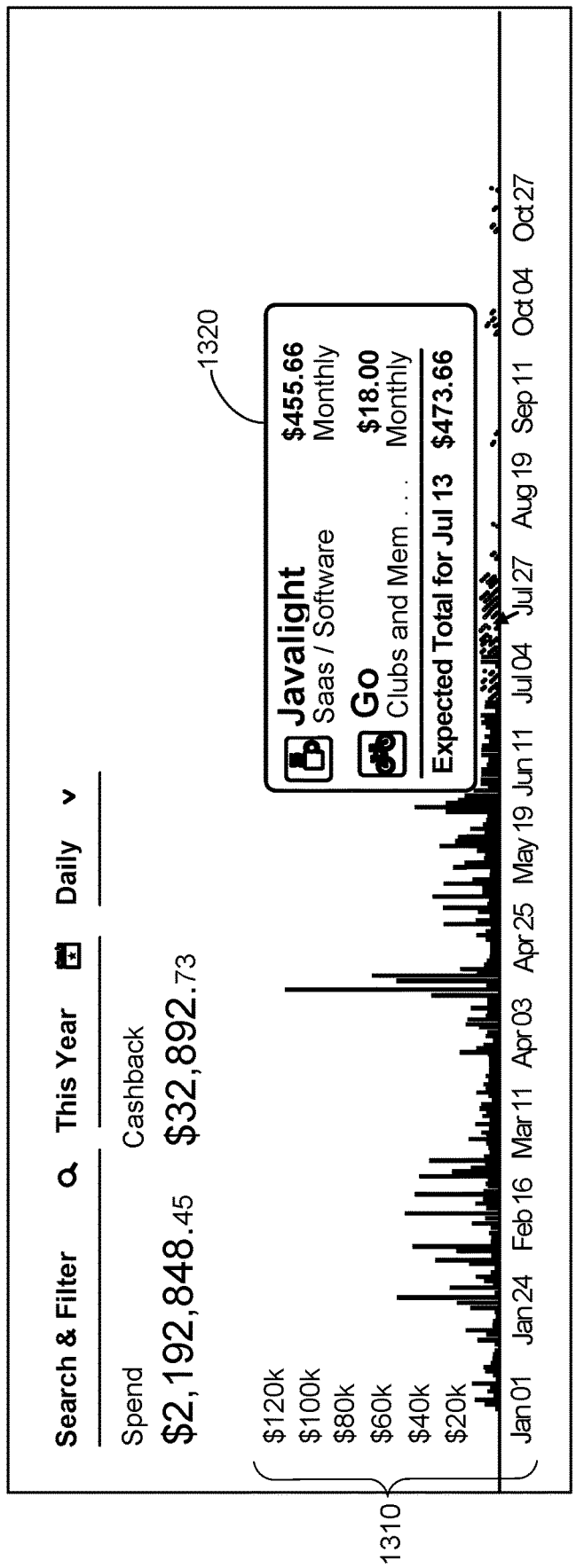
FIG. 13 is a transaction amount illustration portal, in accordance with an embodiment.

FIG. 13 is a transaction amount illustration portal 1300, in accordance with an embodiment. The computing server 110 may cause the portal 1300 to be generated through a common interface (e.g., website) that FIGS. 10-12 may be generated. The portal 1300 provides a graphical illustration of recurring transaction data. Although a bar chart 1310 is shown in FIG. 13, any other suitable chart format for showing recurring transaction data over time may be generated. The bar chart 1310 may provide a total amount for recurring transactions spent over a period of time (e.g., one bar measures one day's amount spent for recurring transactions in that day). The bar chart 1310 may also show the predicted amount to be spent in the future, based on the analysis performed by the transaction analysis engine 230 and the transaction prediction engine 240. The bar chart 1310 shows previous amounts recorded and predicted upcoming amounts. A client may interact with the bar chart 1310 by selecting (e.g., hovering a cursor) a bar in the bar chart 1310. Responsive to receiving the user interaction with the bar, the computing server 110 may update the portal 1300 with a summary panel 1320 showing breakdown of transactions that occurred or will likely occur in the corresponding time period. The computing server 110 may cause the panel 1320 to be generated for display overlaying the bar chart 1310. As shown in the panel 1320, upcoming recurring transactions for two vendors, as determined by transaction analysis engine 230, is shown to the client along with a total amount calculated by the computing server 110.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system comprising:
   a software-as-a-service (SaaS) platform comprising a graphical user interface (GUI) configured to generate a transaction insight portal for a plurality of clients to manage transactions; and
   a computing server in communication with the SaaS platform, the computing server comprising a processor and a memory, the memory configured to store a set of code instructions, the set of code instructions, when executed by the processor, causes the processor to:
   receive transaction data associated with a target client of the SaaS platform;
   determine that the transaction data includes a subscription transaction series;
   apply a recommendation model to the transaction data to identify a transaction improvement recommendation;
   cause the GUI of the SaaS platform to display the transaction improvement recommendation to the target client at the transaction insight portal;
   receive an indication of adoption of the transaction improvement recommendation from the target client; and
   adjust a subscription plan corresponding to the subscription transaction series based on the transaction improvement recommendation.

2. The system of claim 1, wherein the instructions further comprise instructions that, when executed by the processor, cause the processor to:
   receive feedback from the target client indicating a measure of usefulness of the recommendation; and
   retrain the recommendation model based on the feedback.

3. The system of claim 2, wherein the instructions that cause the processor to retrain the recommendation model based on the feedback comprise instructions that, when executed by the processor, cause to processor to, responsive to receiving a predefined amount of feedback from one or more clients of the plurality of clients, retrain the recommendation model.

4. The system of claim 2, wherein the instructions that cause the processor to cause the GUI of the SaaS platform to display the transaction improvement recommendation comprise instructions that, when executed by the processor, cause the processor to, responsive to the measure of usefulness exceeding a threshold, cause the GUI of the SaaS platform to display the transaction improvement recommendation.

5. The system of claim 1, wherein the recommendation model is one of a subscription usage model, a payment channel model, a duplication identification model, or a negotiation model.

6. The system of claim 1, wherein the transaction improvement recommendation pertains to a specific transaction.

7. The system of claim 1, wherein the transaction improvement recommendation pertains to a specific vendor.

8. The system of claim 1, wherein the instructions that cause the processor to determine that the transaction data includes a subscription transaction series comprise instructions that, when executed by the processor, cause the processor to apply a rules-based model to the transaction data, the rules-based model configured to apply one or more rules for detecting a subscription transaction, wherein applying the rules-based model comprises:
    extracting transaction dates from the transaction data;
    determining whether a date of the transaction dates indicates a transaction of the transaction data occurred at least thirty days before the present day; and
    responsive to the date indicating the transaction occurred at least thirty days before the present day:
        determining an average transaction amount of the transaction data;
        determining whether a transaction amount of the transaction data falls within a predefined range centered about the average transaction amount; and
        responsive to the transaction amount falling within of the predefined range centered about the average transaction amount:
            determining a number of transaction amounts of the transaction data that fall within the predefined range centered about the average transaction amount;
            determining whether the number of transaction amounts exceed a threshold number of transactions; and
            determining, responsive to the number of transaction amounts exceeding the threshold number of transactions, that the transaction data is representative of at least one subscription transaction.

9. One or more non-transitory computer readable media configured to store computer code comprising instructions, the instructions, when executed by a processor, causing the processor to:
    receive transaction data associated with a target client of a software-as-a-service (SaaS) platform, the SaaS platform comprising a graphical user interface (GUI) configured to generate a transaction insight portal for a plurality of clients to manage transactions;
    determine that the transaction data includes a subscription transaction series;
    apply a recommendation model to the transaction data to identify a transaction improvement recommendation;
    cause the GUI of the SaaS platform to display the transaction improvement recommendation to the target client at the transaction insight portal;
    receive an indication of adoption of the transaction improvement recommendation from the target client; and
    adjust a subscription plan corresponding to the subscription transaction series based on the transaction improvement recommendation.

10. The non-transitory computer readable media of claim 9, wherein the instructions further comprise instructions that, when executed by the processor, cause the processor to:
    receive feedback from the target client indicating a measure of usefulness of the recommendation; and
    retrain the recommendation model based on the feedback.

11. The non-transitory computer readable media of claim 10, wherein the instructions that cause the processor to retrain the recommendation model based on the feedback comprise instructions that, when executed by the processor, cause to processor to, responsive to receiving a predefined amount of feedback from one or more clients of the plurality of clients, retrain the recommendation model.

12. The non-transitory computer readable media of claim 10, wherein the instructions that cause the processor to cause the GUI of the SaaS platform to display the transaction improvement recommendation comprise instructions that, when executed by the processor, cause the processor to, responsive to the measure of usefulness exceeding a threshold, cause the GUI of the SaaS platform to display the transaction improvement recommendation.

13. The non-transitory computer readable media of claim 9, wherein the recommendation model is one of a subscription usage model, a payment channel model, a duplication identification model, or a negotiation model.

14. The non-transitory computer readable media of claim 9, wherein the transaction improvement recommendation pertains to a specific transaction.

15. The non-transitory computer readable media of claim 9, wherein the transaction improvement recommendation pertains to a specific vendor.

16. The non-transitory computer readable media of claim 9, wherein the instructions that cause the processor to determine that the transaction data includes a subscription transaction series comprise instructions that, when executed by the processor, cause the processor to apply a rules-based model to the transaction data, the rules-based model configured to apply one or more rules for detecting a subscription transaction, wherein applying the rules-based model comprises:
    extracting transaction dates from the transaction data;
    determining whether a date of the transaction dates indicates a transaction of the transaction data occurred at least thirty days before the present day; and
    responsive to the date indicating the transaction occurred at least thirty days before the present day:
        determining an average transaction amount of the transaction data;
        determining whether a transaction amount of the transaction data falls within a predefined range centered about the average transaction amount; and
        responsive to the transaction amount falling within of the predefined range centered about the average transaction amount:
            determining a number of transaction amounts of the transaction data that fall within the predefined range centered about the average transaction amount;
            determining whether the number of transaction amounts exceed a threshold number of transactions; and
            determining, responsive to the number of transaction amounts exceeding the threshold number of transactions, that the transaction data is representative of at least one subscription transaction.

17. A computer-implemented method, comprising:
    receiving transaction data associated with a target client of a software-as-a-service (SaaS) platform, the SaaS platform comprising a graphical user interface (GUI) configured to generate a transaction insight portal for a plurality of clients to manage transactions;
    determining that the transaction data includes a subscription transaction series;

applying a recommendation model to the transaction data to identify a transaction improvement recommendation;

causing the GUI of the SaaS platform to display the transaction improvement recommendation to the target client at the transaction insight portal;

receiving an indication of adoption of the transaction improvement recommendation from the target client; and adjusting a subscription plan corresponding to the subscription transaction series based on the transaction improvement recommendation.

18. The computer-implemented method of claim 17, further comprising:

receiving feedback from the target client indicating a measure of usefulness of the recommendation; and retraining the recommendation model based on the feedback.

19. The computer-implemented method of claim 18, wherein retraining the recommendation model based on the feedback comprises, responsive to receiving a predefined amount of feedback from one or more clients of the plurality of clients, retraining the recommendation model.

20. The computer-implemented method of claim 18, wherein causing the GUI of the SaaS platform to display the transaction improvement recommendation comprises, responsive to the measure of usefulness exceeding a threshold, causing the GUI of the SaaS platform to display the transaction improvement recommendation.

* * * * *